United States Patent
Uehara et al.

(10) Patent No.: US 6,215,968 B1
(45) Date of Patent: Apr. 10, 2001

(54) IMAGE FORMING APPARATUS WITH HALF-TONE DENSITY CONTROL

(75) Inventors: Makoto Uehara, Nara; Toshihiro Ohta, Ikoma-gun; Yasutaka Maeda, Soraku-gun; Takashi Kitagawa, Yamatokoriyama; Katsuhiro Nagayama, Yamabe-gun; Shouji Tomita, Yao; Kaori Dakeshita, Gose; Daisaku Imaizumi, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/545,721

(22) Filed: Apr. 7, 2000

(30) Foreign Application Priority Data

Apr. 27, 1999 (JP) .................................................. 11-120176
Sep. 24, 1999 (JP) .................................................. 11-271070

(51) Int. Cl.$^7$ ............................ G03G 15/00; H04N 1/407
(52) U.S. Cl. ............................................. 399/49; 358/298
(58) Field of Search ......................... 399/46, 49; 347/131, 347/240; 358/504, 526, 298, 300

(56) References Cited

FOREIGN PATENT DOCUMENTS

| 7-20669 | * | 1/1995 | (JP) . |
| 8-265571 | | 10/1996 | (JP) . |
| 8-286442 | * | 11/1996 | (JP) . |
| 8-289148 | | 11/1996 | (JP) . |

* cited by examiner

Primary Examiner—Joan Pendegrass
(74) Attorney, Agent, or Firm—Dike, Bronstein, Roberts & Cushman, LLP; David G. Conlin; David A. Tucker

(57) ABSTRACT

A high density detecting toner pattern is formed on a photosensitive body and a high density correction is effected by comparing a value detected by a reflection sensor with a high density reference value so as to maintain an image density at a specific level. An image density correcting section adopts a result of the preceding high density correction as the high density reference value, and compares the same with a result of a current high density correction. The image density correcting section effects the half-tone density correction only when a difference reaches or exceeds a preset difference reference value by forming a half-tone density detecting toner pattern on the photosensitive body and comparing a value detected by the reflection sensor with a half-tone reference value. Consequently, it has become possible to provide an image forming apparatus which can maintain a density output of an entire image at a specific level for any kind of images including solid, line, and half-tone, etc. while shortening a time required for the density correction and reducing a quantity of toner consumed for the density correction.

26 Claims, 13 Drawing Sheets

IMAGE FORMING APPARATUS WITH HALF-TONE DENSITY CONTROL

FIELD OF THE INVENTION

The present invention relates to an image forming apparatus employing an electrophotographic technique, such as a copying machine, a laser beam printer, and a facsimile machine.

BACKGROUND OF THE INVENTION

A color electrophotographic device includes a plurality of photosensitive drums 1 as shown in FIG. 2 explaining an image forming apparatus of the present invention. Each photosensitive drum 1 is supported rotatably and driven to rotate in a direction indicated by an arrow by means of a driving device.

Provided sequentially around each photosensitive drum 1 are: a charging device 2 for charging the surface of the photosensitive drum 1 uniformly; exposing means 3 for exposing the surface of the photosensitive drum 1 to form a latent image; a developing device 4 for developing the latent image to a toner image; a transferring device 5 for transferring the toner image onto a transfer material; and a cleaning device 6 for cleaning residual toner on the surface of the photosensitive drum 1.

The four photosensitive drums 1 are aligned in series, and provided with developing bathes respectively containing color toners: Y (yellow), M (Magenta), C (Cyan), and Bk (Black).

The transferring device 5 is provided with a transfer belt 7 which is looped over a driving pulley and a slave pulley and run in a direction indicated by arrows. A recording medium as the transfer material is held electrostatically and thus transported by the transfer belt 7.

Transfer chargers 8 are provided inside the loop of the transfer belt 7 so as to oppose the respective photosensitive drums 1, thereby transferring toner images formed on their respective photosensitive drums 1 onto the recording medium.

The recording medium held by the transfer belt 7 passes by the four photosensitive drums 1 and further a fusing device 9, whereby the toner image is fused onto the same.

In the electrophotographic device represented by the above color electrophotographic device, density characteristics vary with an applied voltage and a temperature rise caused by a series of charging, exposing, and developing actions in the electrophotographic process. For this reason, before input image data is outputted, the density characteristics are corrected as desired in most of the cases.

More specifically, a plurality of toner patterns each having a specific density are formed on the photosensitive drum 1 each time the power supply starts or a predetermined number of sheets are released. Then, the densities of these toner patterns are checked by a sensor, and differences between the checked densities and corresponding optimal densities, that is, the preset reference values, are found. Then, a density conversion table is created based on these differences. Thereafter, the density of the input image data is corrected based on the density conversion table thus created before the image is outputted.

Incidentally, an image forming apparatus, such as an electrophotographic device, outputs several kinds of images including solid (black-painted), line, half-tone, etc. Images vary when influenced by varying factors, namely, a series of charging, exposing, developing, and transferring actions in the electrophotographic process, and therefore, the density of an output image can not be maintained at a specific level without effecting a density correction. In addition, influence from the varying factors in the electrophotographic process varies with the kinds of images, and a density correction has to be controlled differently for each kind of images.

However, because the conventional image forming apparatus controls a quantity of toner to be adhered to the photosensitive drum 1 by detecting the density or a quantity of toner on a solid image, there rises a problem that a density of an entire output image can not be made uniform for each kind of images.

To solve the above problem, for example, Japanese Laid-open Patent Application No. 265571/1996 (Japanese Official Gazette, Tokukaihei No. 8-265571, publishing date: Oct. 11, 1996) discloses an image forming apparatus as follows.

That is, the image forming apparatus disclosed in the above publication forms two kinds of density detecting toner patterns, namely, a high density detecting toner pattern and a half-tone density toner pattern, by changing a developing bias, so that the density of an entire image having half-tones, etc. can be corrected adequately.

The high density detecting toner pattern is detected by toner quantity detecting means composed of a reflection sensor, and the maximum toner quantity on the photosensitive drum is controlled by density correcting means. The half-tone detecting toner pattern is also detected by the toner quantity detecting means, and a toner quantity on the photosensitive drum for a half-tone density portion is adjusted under control of the density correcting means. By effecting both the control of the maximum toner quantity using the high density detecting toner pattern and the control of the toner quantity for the half-tone density portion using the half-tone detecting toner pattern, the density of an entire image is maintained uniformly at a specific level.

More specifically, the density correcting means has the toner quantity detecting means detect the high density from the high density detecting toner pattern, compares the detected high density with the high density reference value, and effects the high density correction if there is a difference. Further, after the high density portion of the image is adjusted, the density correcting means has the toner quantity detecting means detect the half-tone density from the half-tone density detecting toner pattern, compares the detected half-tone density with the half-tone density reference value, and effects the half-tone density correction if there is a difference.

Also, Japanese Laid-open Patent Application No. 289148/1996 (Japanese Official Gazette, Tokukaihei No. 8-289148, publishing date: Nov. 1, 1996) discloses a half-tone density correction. According to this publication, a plurality of half-tone toner patterns of respective colors are formed on a transfer belt by changing a pulse width of a laser beam during the exposing action in the series of charging, exposing, developing, and transferring actions, and these patterns are checked sequentially by a density detecting sensor, whereby an optical density is detected from the checking results.

Then, the checked density values are compared with prestored target density values of their respective colors, and differences between the target density values and current density values are computed to update a half-tone table.

As has been discussed, the density correction using the toner patterns is effected by forming a plurality of toner patterns each time the power supply starts or a predetermined number of sheets are released.

Hence, the conventional image forming apparatus not only effects the high density correction, but also adjusts the half-tone density, and therefore, the density correction takes a considerably long time. Consequently, the conventional image forming apparatus keeps the user waiting longer compared with an image forming apparatus which effects the high density correction alone, thereby posing a problem as not being user-friendly.

In addition, because the half-tone density is adjusted in addition to the high density correction, a larger quantity of toner is consumed in forming the half-tone density detecting toner patterns for the half-tone density adjustment, thereby increasing the cost undesirably.

The following will explain more in detail the half-tone density correction method disclosed in Japanese Laid-open Patent Application No. 289148/1996 supra. Initially, a first density conversion table used as a reference is created at the time of maintenance. Then, when an image is outputted, a toner pattern is formed each time a predetermined number of copies are made, and the density of the toner pattern is checked, based on which a second density conversion table is created. Subsequently, a new density conversion table for use in actual image output is created based on the first and second density conversion tables. In other words, for a middle density area, an interior division of the first and second density conversion tables is used, and for a low/high density area, table values are set linearly with a certain gradient with reference to the neighboring middle density area.

Generally, forming a toner pattern and checking the density thereof involves various kinds of treatments of the photosensitive body, developing device, sensor in the transferring device, etc. However, the density of the toner pattern may include noise for various reasons during these treatments. In such a case, if the density conversion table is created on the assumption that the detected density of the toner pattern is completely correct, an output image may be formed with a density at an incorrect level. Also, the number of toner patterns is generally smaller than that of the levels of the output image density, and for this reason, a density conversion table covering all the levels is created by means of interpolation. However, if a density conversion table is created incorrectly by means of interpolation, an output image may be formed with a density at an incorrect level.

Further, in order to complete the interpolation precisely, a significant length of time is required and there arises a problem that such an image forming apparatus can not be put into practical use.

On the other hand, in case of a multi-color image formed by superimposing images of respective colors, if a correction is made based on a density difference in only one color as is in the conventional method, variance in a color balance of the entire multi-color image can not be detected accurately.

In other words, a color balance of the entire color image varies markedly with ambient temperature and humidity, and life characteristics of members involved in image formation. Thus, in order to output a color image, it is essential to judge variance in a color balance of the entire color image and correct the same.

In addition, an image density varies with the foregoing varying factors whether in the high density area or half-tone density area, and the variance often differs significantly among colors.

Conventionally, in order to solve the above problem, whether a correction action should be effected or not is determined by variance in only one color, that is, when a difference from the reference density becomes greater than a predetermined value. In other words, as shown in FIG. 12, when an image density supposed to be within an area A indicted by diagonal lines is actually in an area B.

However, if a member involved in image formation is replaced, as shown in FIG. 13, the density may change from a density curve before replacing a member (indicated by an alternate long and short dash line) to a density curve after replacing a member (indicated by an alternate long and two short dashes line). In such a case, variance in a color balance can not be judged precisely.

In other words, FIG. 13 shows the density change of only one color, but each color varies differently with ambient temperature and humidity, and the life characteristics of the members. Thus, even if a difference from the reference density is small in each color, when a toner image of each color is superimposed to form a multi-color image, a color balance of the resulting color image often varies.

Thus, whether a correction action should be effected or not is conventionally determined by variance in only one color as shown in FIG. 12, but variance of a color image can not be judged precisely by this conventional method.

SUMMARY OF THE INVENTION

The present invention is devised to solve the above problems, and therefore, has an object to provide an image forming apparatus which can maintain a density output of an entire image at a specific level for any kind of images including solid, line, half-tone, etc., while shortening the time required for a density correction and reducing a quantity of toner consumed for the density correction.

In order to fulfill the above and other objects, an image forming apparatus of the present invention is an image forming apparatus furnished with:

a density detecting sensor for detecting a density of a predetermined high density detecting toner pattern formed on a photosensitive body and a density of a predetermined half-tone density detecting toner pattern formed on the photosensitive body; and an image density correcting section for effecting a high density correction by comparing a value detected from the high density detecting toner pattern by the density detecting sensor with a high density reference value, and effecting a half-tone density correction by comparing a value detected from the half-tone density detecting toner pattern by the density detecting sensor with a half-tone density reference value, wherein the image density correcting section determines whether the half-tone density correction should be effected or not based on a result of the high density correction.

According to the above invention, the followings are carried out by the image density correcting section to maintain an image density at a specific level. That is, a predetermined high density detecting toner pattern is formed on the photosensitive body for the high density correction. Then, a value detected from the high density detecting toner pattern by a reflection toner sensor or the like is compared with the high density reference value, whereby a quantity of the high density correction is determined. In addition, a predetermined half-tone density detecting toner pattern is formed on the photosensitive body for a half-tone density correction. Then, a value detected from the half-tone density detecting toner pattern by the reflection sensor is compared with the half-tone density reference value, whereby a quantity of the half-tone density correction is determined.

Consequently, not only can the high density be maintained at a specific level, but also a density of an entire image can be constantly maintained at a specific level by automatically correcting the half-tone density.

Here, the image density correcting section determines whether the half-tone density correction should be effected or not based on the result of the high density correction.

In other words, the half-tone density correction is not effected following each high density correction. Whether the half-tone density correction should be effected or not is judged based on the result of the high density correction, and the half-tone density correction is effected in accordance with the result, thereby making it possible to shorten the time required for the density correction and reduce a quantity of toner consumed for the density correction. In addition, because the half-tone density correction is effected only when it is absolutely necessary, high efficiency can be attained.

Also, the high density correction is effected by comparing the value detected from the high density detecting toner pattern by the density detecting sensor with the high density reference value. Hence, the density characteristics of the input image data can be corrected in response to variance of the density characteristics caused by circumstances, such as an applied voltage and a temperature rise during a series of charging, exposing, and developing actions in the electrophotographic process. As a result, it has become possible to provide an image forming apparatus which can maintain a density output of an entire image at a specific level for any kind of images including solid, line, and half-tone, etc. while shortening a time required for the density correction and reducing a quantity of toner consumed for the density correction.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIGS. 1 through 6, the following description will describe one embodiment of the present invention. The present embodiment will describe a color electrophotographic device as an image forming apparatus, but the present invention is not limited to the foregoing and can be also applied to a monochromatic electrophotographic device as an image forming device. Further, the present invention can be applied to other image forming apparatuses employing the electrophotographic technique, such as a copy machine, a laser beam printer, and a facsimile machine.

Figure 2:
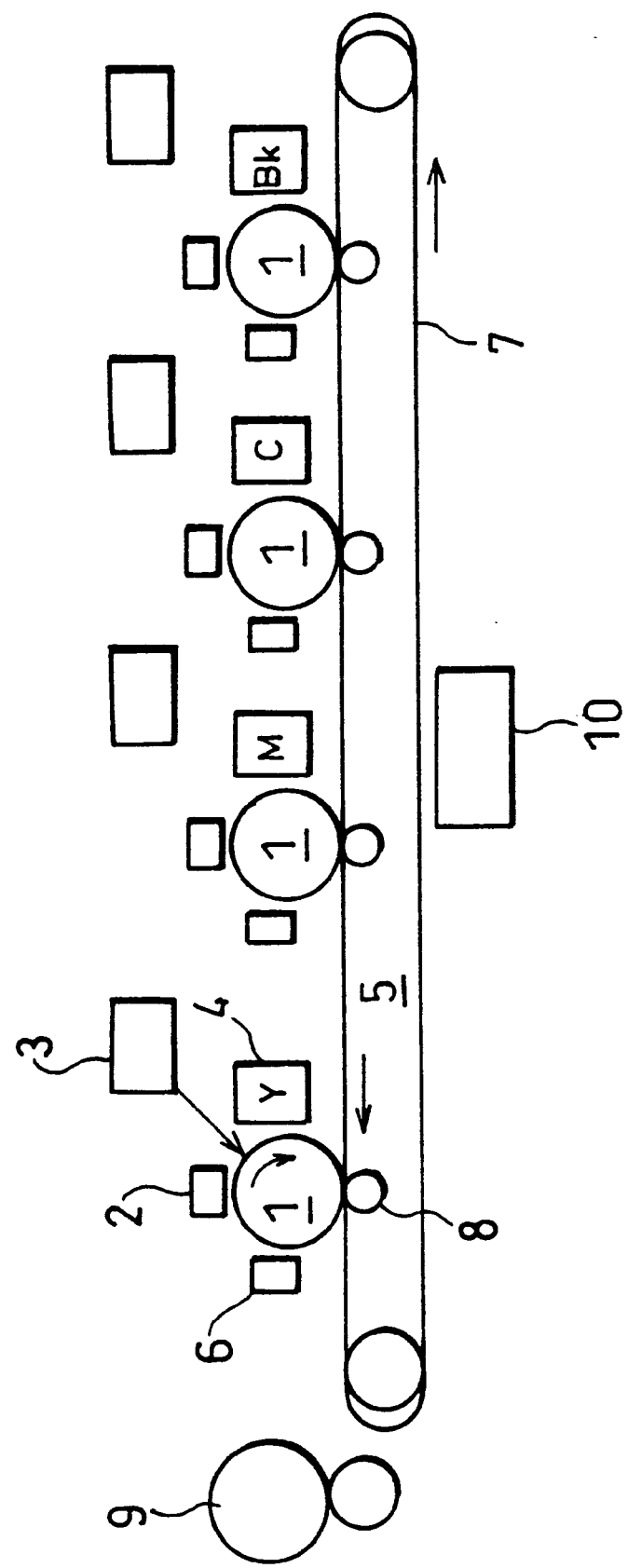
FIG. 2 is a view schematically showing an arrangement of an image process portion of the color electrophotographic device.

A color electrophotographic device of the present embodiment includes, as shown in FIG. 2, a plurality of photosensitive drums 1. Each photosensitive drum 1 is supported rotatably and driven to rotate in a direction indicated by an arrow by means of a driving device.

Provided sequentially around each photosensitive drum 1 are: a charging device 2 for changing the surface of the photosensitive drum 1 uniformly; an exposing device 3 for exposing the surface of the photosensitive drum 1 to form a latent image; a developing device 4 for developing the latent image to a toner image; a transferring device 5 for transferring the toner image onto a transfer material; and a cleaning device 6 for cleaning residual toner on the surface of the photosensitive drum 1.

The four photosensitive drums 1 are aligned in series, and provided with developing bathes respectively containing color toners: Y (yellow), M (Magenta), C (Cyan), and Bk (Black).

The transferring device 5 is provided with a transfer belt 7 which is looped over a driving pulley and a slave pulley and run in a direction indicated by arrows. A recording medium as the transfer material is held electrostatically and thus transported by the transfer belt 7.

Transfer chargers 8 are provided inside the loop of the transfer belt 7 so as to oppose the respective photosensitive drums 1, and transfer toner images formed on the photosensitive drums 1 onto a recording medium electrostatically held and thus transported by the transfer belt 7. Although it is not illustrated in the drawing, a cleaning member, an erasing member for removing charges accumulated on the transfer belt 7, etc. are also provided in the inside and outside of the loop of the transfer belt 7.

The recording medium held by the transfer belt 7 passes by the four photosensitive drums 1 and further a fusing device 9, whereby the toner image is fused onto the same.

On the other hand, as shown in the drawing, the color electrophotographic device of the present embodiment is provided with a density detecting sensor 10 serving as toner quantity detecting means at an adequate position below the transfer belt 7 to oppose the same.

Figure 3:
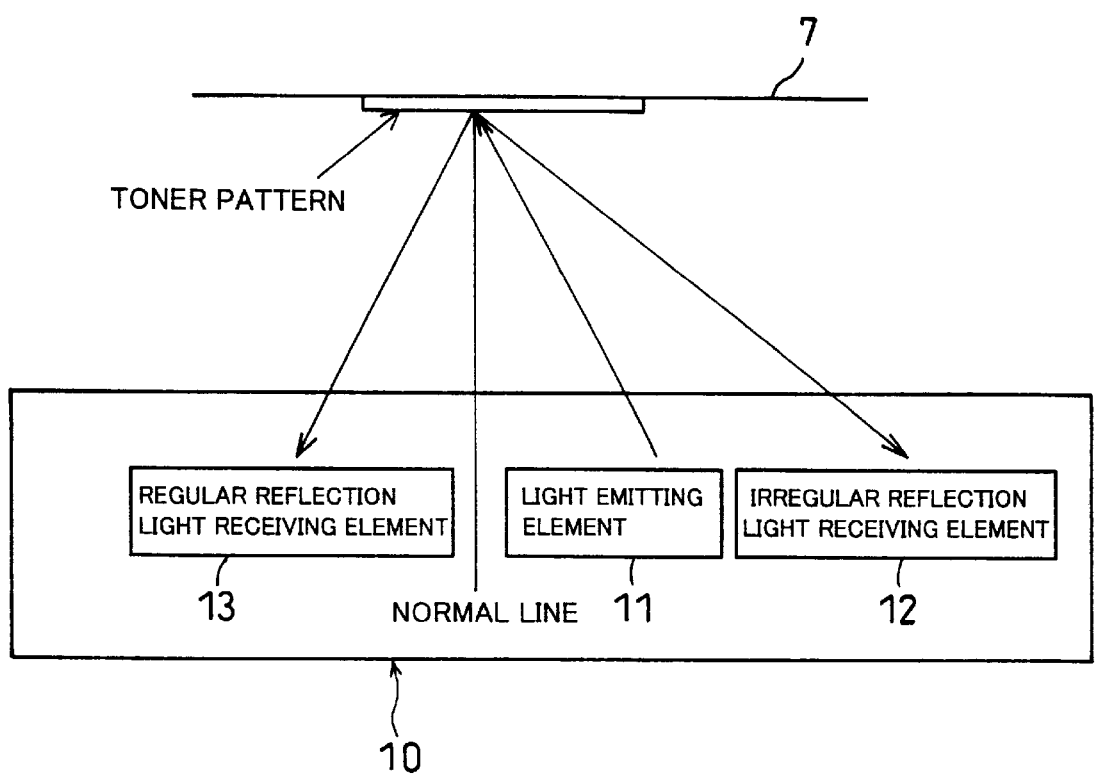
FIG. 3 is a view depicting an arrangement of a density detecting sensor provided in the color electrophotographic device for detecting a density of a high density detecting toner pattern or a half-tone density detecting toner pattern.

The density detecting sensor 10 is a reflection sensor, and as shown in FIG. 3, it includes a light emitting element 11, an irregular reflection light receiving element 12, and a regular reflection light receiving element 13, so that both a color density and a black density can be detected.

In other words, in order to detect a color density, light emitted from the light emitting element 11 and reflected irregularly by a toner image, such as a toner pattern transferred onto the transfer belt 7, is received by the irregular reflection light receiving element 12, and a voltage corresponding to a quantity of received light is generated.

In order to detect a black density, light emitted from the light emitting element 11 and reflected regularly by a toner image, such as a toner pattern transferred onto the transfer belt 7, is received by the regular reflection light receiving element 13, and a voltage corresponding to a quantity of received light is generated.

The transfer belt 7 is made of denatured polyimide to give a large reflectance difference to the toner, and regular reflectance of 10% or greater is given by applying mirror finishing on the surface thereof.

The color electrophotographic device of the present embodiment corrects the image density of an output image adequately by forming two kinds of density detecting toner patterns, namely, a high density detecting toner pattern and a half-tone density detecting toner pattern, on the photosensitive drums 1 by changing a developing bias. Each of the high density detecting toner pattern and half-tone density detecting toner pattern is formed as a reference value whenever an image is formed.

The high density detecting toner pattern and half-tone density detecting toner pattern are formed on a non-image-forming area of the photosensitive drums 1.

The high density detecting toner pattern is formed in the form of a solid image, whereby a control is effected under the condition that the maximum toner quantity is set as an adequate quantity.

On the other hand, a plurality of the half-tone density detecting toner patterns are formed with different densities each in a 3×3 pixel matrix. In other words, a certain number of dots are formed by toner in a specific area in the 3×3 pixel matrix, and by sequentially increasing the number of dots, toner patterns having densities at a plurality of levels (from the low density area to near the high density area of a solid image) are formed in the half-tone density area. Consequently, a toner quantity in the half-tone density area can be controlled.

Thus, by using both the high density detecting toner pattern and half-tone density detecting toner patterns, an image having a uniform density can be outputted.

Figure 1:
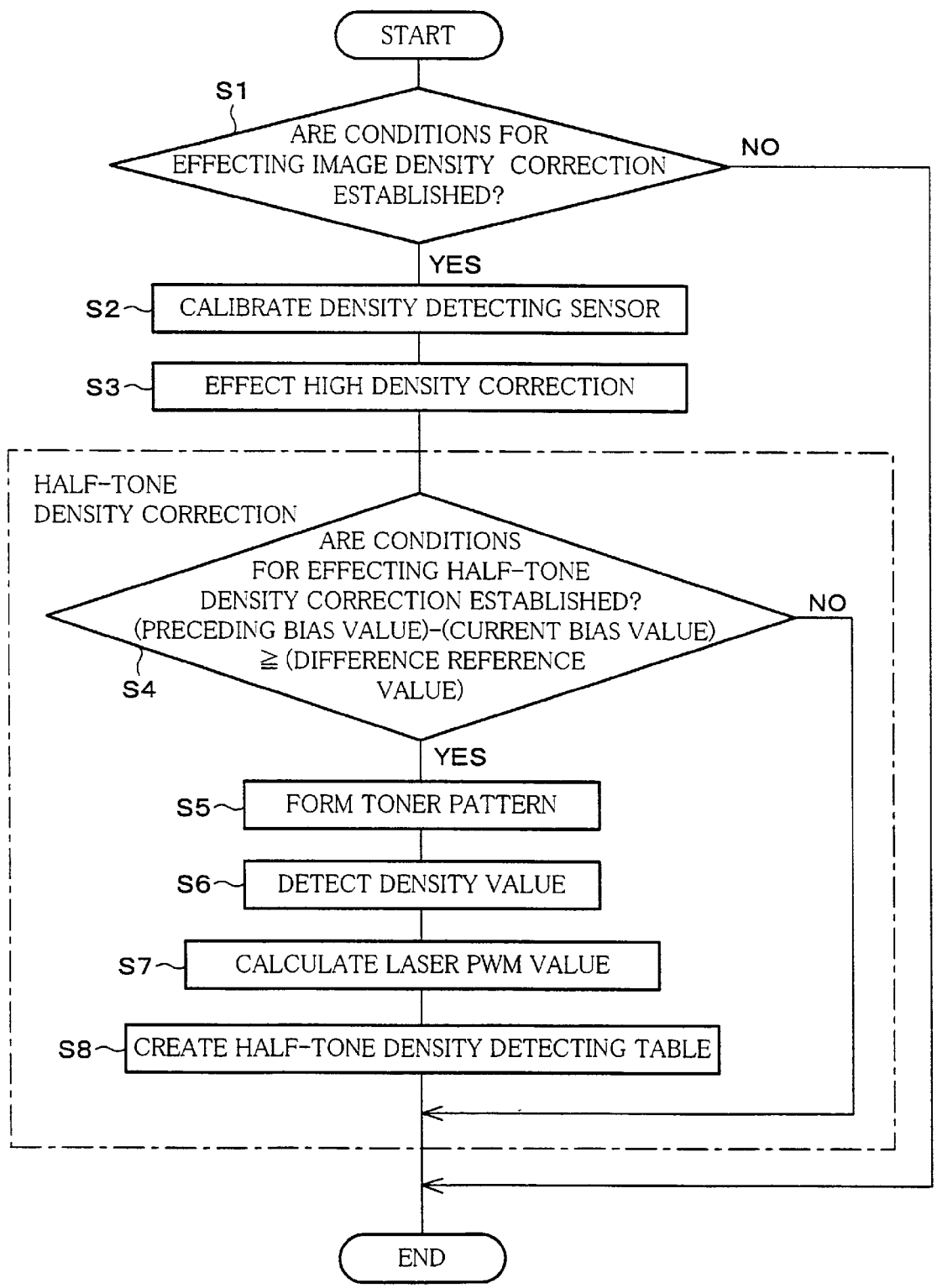
FIG. 1 is a view showing a color electrophotographic device in accordance with one embodiment of the present invention, showing a flowchart detailing actions where the result of the preceding high density correction is adopted as the high density reference value and compared with the result of a current high density correction, and the half-tone density correction is effected only when a difference reaches or exceeds a preset difference reference value.

Next, the following will explain the image density correction effected by unillustrated image density correcting means of the above-arranged color electrophotographic device with reference to the process control flowchart of FIG. 1.

As shown in the drawing, whether conditions for effecting the image density correction are established or not is judged (S1), and if the conditions are established, the density detecting sensor 10 is calibrated (S2), and the high density correction is effected (S3).

Here, the high density correction will be explained in detail.

In the first place, each photosensitive drum 1 is charged, exposed, and developed, during which predetermined high density detecting toner patterns of respective colors described below are formed on the respective photosensitive drums 1 by changing the developing bias. The high density detecting toner patterns of respective colors thus formed are transferred onto the transfer belt 7, and checked sequentially by the density detecting sensor 10 to determine a correction quantity.

In case of a color high density correction, three kinds of 100% solid patterns are formed on the transfer belt 7 by changing a developing bias as specified below through a series of charging, exposing, developing, and transferring actions:

v1: low voltage (50V lower than a preceding developing bias)
v2: reference voltage (the preceding developing bias)
v3: high voltage (50V higher than the preceding developing bias).

Figure 4A:
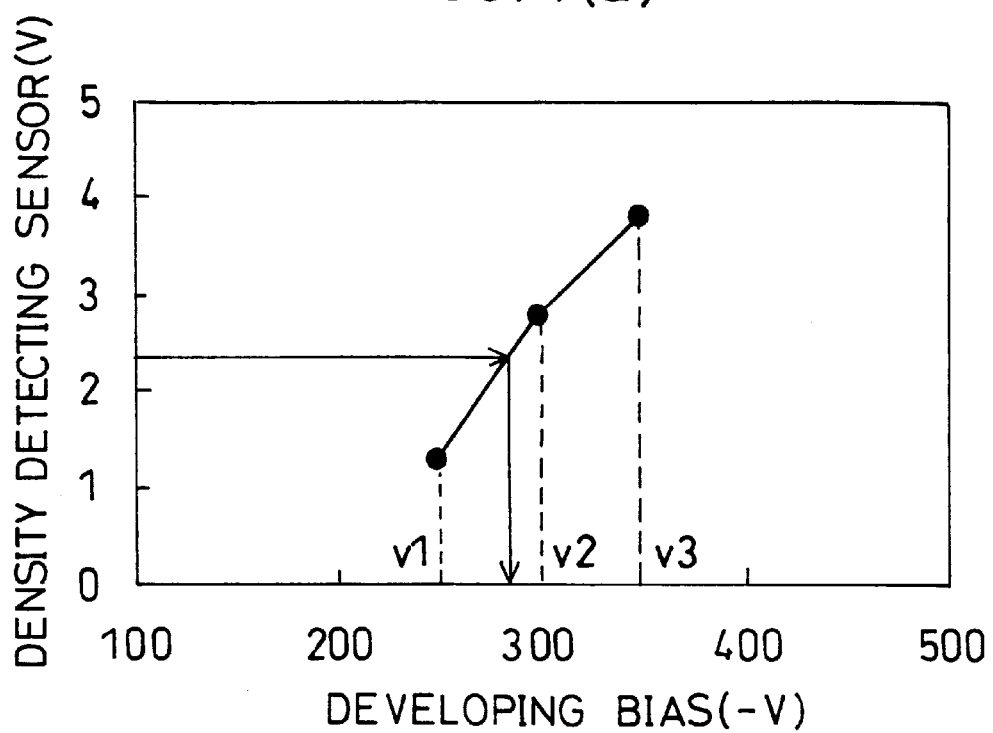
FIG. 4(a) is a view explaining a high density correction of a color image when the density correction is effected by the density detecting sensor in the color electrophotographic device.

Then, these high density detecting toner patterns are sequentially checked by the density detecting sensor 10, and an optical density is detected from the checking results. As shown in FIG. 4(a), three points are linked linearly and a developing bias corresponding to the reference sensor value is adopted. In the drawing, 2.4V is given as the reference sensor and −300V is given as the reference voltage used as the reference value of the preceding developing bias.

Next, in case of a black high density correction, three kinds of 80% solid patterns are formed on the transfer belt 7 by changing a developing bias as specified below through a series of the charging, exposing, developing, and transferring actions (80% solid patterns are used because reflected light from 100% solid patterns is too weak to detect):

v1': low voltage (50V lower than a preceding developing bias)
v2': reference voltage (the preceding developing bias)
v3': high voltage (50V higher than the preceding developing bias).

Then, these toner patterns are sequentially checked by the density detecting sensor 10, and an optical density is detected from the checking results in accordance with Equation (1):

$$\text{density} = \frac{\text{reflectance of toner pattern}}{\text{reflectance on transfer belt}}. \quad (1)$$

As shown in FIG. 4 (b), three points are linked linearly, and a developing bias corresponding to a specific value (herein the reference sensor value of 1V) is divided by 0.8, and the resulting value is adopted as a developing bias. By using Equation (1) above, the reflectance on the transfer belt 7 can be regulated, and the density can be read in a stable manner.

In the present embodiment, the half-tone density correction is not effected following each high density correction. That is, as shown in FIG. 1, whether conditions for effecting the half-tone density correction are established or not is judged (S4), and the half-tone density correction is effected only when the conditions are established.

This is because the half-tone density correction requires a plurality of half-tone density detecting toner patterns of respective colors, and there arises a problem that a correction time is extended considerably and a large quantity of toner is consumed. Thus, the number of actions and timing are crucial factors for high efficiency.

In the present embodiment, as shown in FIG. 1, the half-tone density correction is effected only when a difference between the developing bias set in the preceding high density correction and the developing bias set in the current high density correction exceeds a difference reference value.

In other words, in the present embodiment, the result of the current high density correction, that is, the developing bias voltage value determined in the current high density correction is compared with the result of the preceding high density correction, that is, the developing bias voltage value determined in the preceding high density correction, and the half-tone density correction is effected following the high density correction only when the difference reaches or exceeds the preset difference reference value.

Also, in the present embodiment, the developing bias ±50V is given as the difference reference value, and the half-tone density correction is effected only when the difference reaches or exceeds the developing bias ±50V. Here, ±50V is given as the difference reference value on the assumption that it is appropriate to effect at least the half-tone density correction following the high density correction when the difference reference value reaches or exceeds ±50V. However, it should be appreciated that the difference reference value is not limited to ±50V.

In the above half-tone density correction, as shown in FIG. 1, a plurality of half-tone density detecting toner patterns of respective colors having different densities are formed on the transfer belt 7 by modulating the pulse width of the laser beam at the time of exposure during a series of the charging, exposing, developing, and transferring actions (S5). Then, the half-tone density detecting toner patterns are sequentially checked by the density detecting sensor 10 (S6), and a laser PMW (Pulse Wave Modulation) value is computed from the checking results to detect an optical density (S7) in the same manner as described in the high density correction.

Next, the detected values are compared with the prestored half-tone density reference values of respective colors, and a difference between the half-tone density reference value and a current value is computed, based on which a half-tone density correction table is updated (S8). Thereafter, the half-tone density is corrected based on the half-tone density correction table thus updated. It should be appreciated that the initial table for the half-tone density reference values is created at the time of maintenance.

Figure 5:
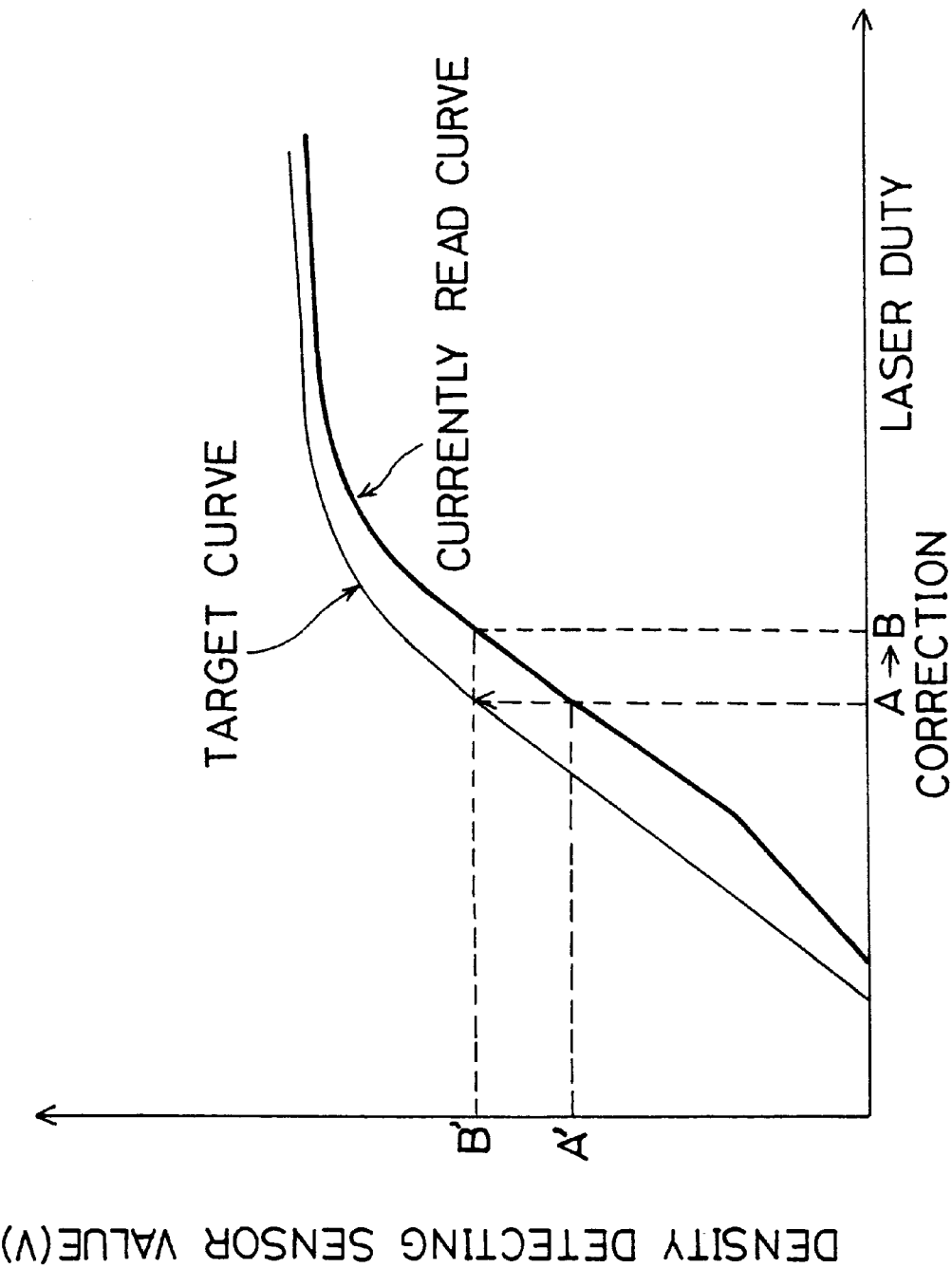
FIG. 5 is a view explaining a state when the half-tone density correction is effected in the color electrophotographic device.

An example half-tone density correction will be described more in detail. As shown in FIG. 5, A' is given as the current detection value of the density detecting sensor 10 and B' is given as the half-tone density reference value at a laser duty A (laser output). Then, the half-tone density reference value B' is secured as a sensor value by shifting the laser duty A to a laser duty B, whereby the image density is maintained.

Consequently, the half-tone density of the image can be also maintained at the specific level.

In judging the conditions for effecting the half-tone density correction in S4, if the difference reference value is smaller than 50V, the half-tone density correction is not effected and an image is outputted following the high density correction.

Next, timing of effecting the high density correction and half-tone density correction will be explained with reference to FIG. 6.

Figure 6:
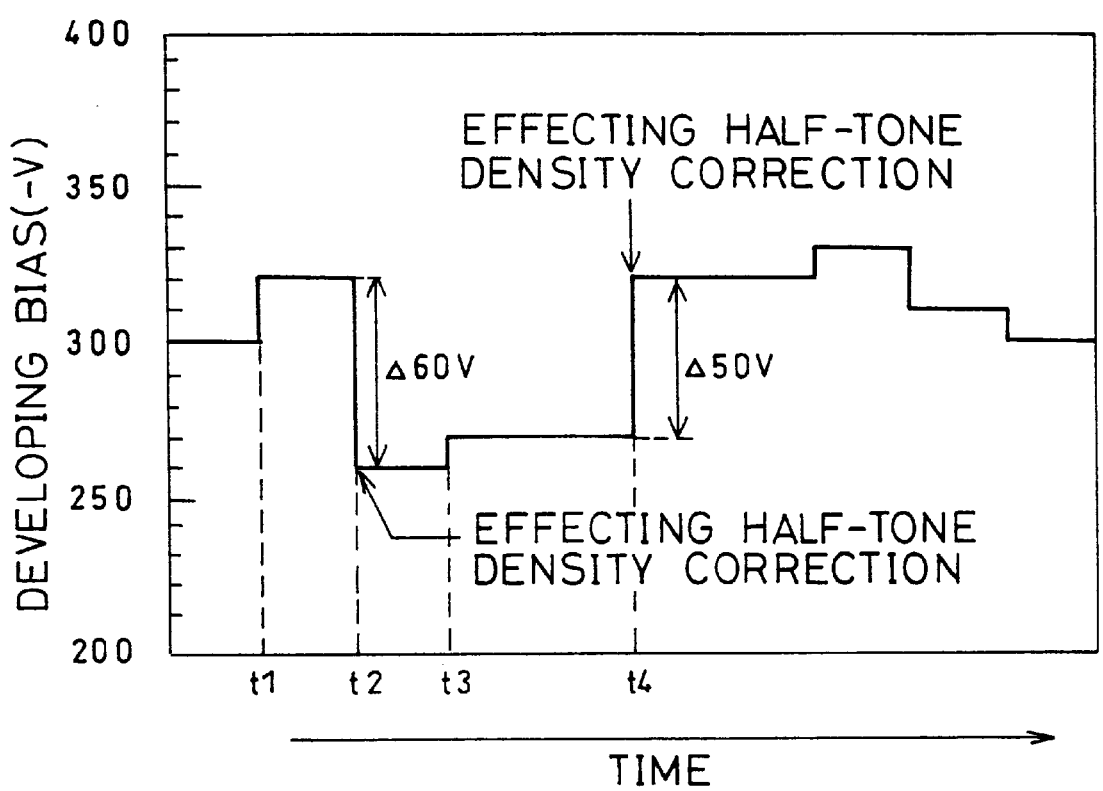
FIG. 6 is a view explaining timing at which the high density correction and half-tone density correction are effected in the color electrophotographic device.

In FIG. 6, a developing bias voltage value of −300V is given as the initial high density reference value when the color electrophotographic device starts to rise.

Then, the high density correction is effected at a time t1, and the developing bias voltage is changed to −320 as the result of the high density correction. Here, Δ20V is given as a difference from the developing bias voltage value of −300V adopted as the preceding high density reference value. Thus, because the conditions that the difference reference value is 50V or greater are not satisfied, the half-tone density correction is not effected.

Next, the high density correction is effected again at a time t2, and the developing bias voltage value is changed to −260V. Thus, Δ60V is given as a difference from the developing bias voltage value of −320V adopted as the high density reference value as the result of the preceding high density correction.

Thus, because the conditions that the difference reference value is 50V or greater are satisfied, the half-tone density correction is effected.

Then, the high density correction is effected again at a time t3. However, the developing bias voltage value at this point is −270V and Δ10V is given as a difference from the developing bias voltage of −260V adopted as the preceding high density reference value. Thus, because the conditions that the difference reference value is 50V or greater are not satisfied, the half-tone density correction is not effected.

Then, the high density correction is effected again at a time t4. Then, the developing bias voltage value is changed to −320V as the result, and Δ50 is given as a difference from the developing bias voltage value of −270V adopted as the preceding high density reference value. Thus, because the conditions that the difference reference value is 50V or greater are satisfied, the half-tone density correction is effected.

In this manner, the above correction method exploits the fact that when the density characteristics vary markedly in response to the developing bias, the density characteristics are most likely vary in response to a laser output.

Consequently, by maintaining the high density at a constant level and correcting the half-tone density automatically, the density of an entire image can be maintained constantly at a specific level. In addition, by determining whether the half-tone density correction should be effected or not based on the result of the highest density correction, the half-tone density correction is not effected when unnecessary, and therefore, can be effected efficiently. Hence, the time required for the density correction can be shortened and a quantity of toner consumed for the density correction can be reduced.

According to the present embodiment, in case of the density correction of a color image, the high density reference value is compared with the result of the current high density correction, and if a difference in at least one color reaches or exceeds the difference reference value, the half-tone density correction is effected for all the colors following the high density correction.

By effecting the half-tone density correction for all the colors even when the half-tone density correction is necessary for only one color, a color balance can be maintained in a reliable manner.

As has been discussed, in the color electrophotographic device of the present embodiment, the unillustrated image density correcting means carries out the followings to maintain the image density at a specific level. That is, predetermined high density detecting toner patterns are formed on the photosensitive drums 1 by changing the developing bias for the high density correction. Then, the detected values of the high density detecting toner patterns detected by the density detecting toner 10 are compared with the high density reference values, and a quantity of the high density correction is determined. Also, predetermined half-tone density detecting toner patterns are formed on the photosensitive drums 1 by changing the developing bias for the half-tone density detection. Then, the detected values of the half-tone density detecting toner patterns detected by the density detecting sensor 10 are compared with the half-tone density reference values, and a quantity of the half-tone density correction is determined.

As a result, by maintaining the high density at a specific level and automatically correcting the half-tone density, the density of an entire image can be maintained constantly at a specific level.

The image density correcting means adopts the result of the preceding high density correction as the high density reference value, and compares the same with the result of the current high density correction. Then, the image density correcting means effects the half-tone density correction by raising/dropping the surface potential of the photosensitive drums 1 by adjusting the laser output during the exposure following the high density correction only when the difference reaches or exceeds the preset difference reference value.

In other words, the high density reference value is updated to the result of the latest high density correction each time the high density correction is effected, and the result of the current high density correction is compared with the updated high density reference value.

On the other hand, the half-tone density correction is not effected following each high density correction. The half-tone density correction is effected following the high density correction only when the updated high density reference value is compared with the result of the current high density correction and a difference reaches or exceeds the preset difference reference value.

As a result, whether the half-tone density correction should be effected or not is judged based on the result of the high density correction, and the half-tone density correction is effected in accordance with the result, thereby making it possible to shorten the time required for the density correction and reduce a quantity of toner consumed for the density correction.

In addition, whether the half-tone density correction should be effected or not is judged by comparing the updated high density reference value with the result of the current high density correction and then judging whether a difference reaches or exceeds the preset difference reference value.

Thus, the half-tone density correction is effected only when there is a considerable difference from the updated high density reference value. In short, because the half-tone density correction is effected only when it is absolutely necessary, high efficiency can be attained.

Further, the high density reference value is updated each time the high reference correction is effected. Thus, the density characteristics of the input image data can be corrected in response to variance of the density characteristics caused by circumstances, such as an applied voltage and a temperature rise during a series of charging, exposing, and developing actions in the electrophotographic process.

As a result, it has become possible to provide an image forming apparatus which can maintain a density output of an entire image at a specific level for any kind of images including solid, line, and half-tone, etc. while shortening a time required for the density correction and reducing a quantity of toner consumed for the density correction.

On the other hand, in case of a color image, if the half-tone density correction is effected for each color including Y (Yellow), M (Magenta), C (Cyan), and Bk (Black) each time the high density correction is effected, a far longer time is required for the density correction compared with the density correction of a monochromatic image. Thus, the user is kept waiting for a considerable time and such a device is not user-friendly.

In the present embodiment, however, the image density correcting means compares the high density reference value with the result of the current high density correction when effecting the density correction of a color image, and the half-tone density correction is effected for all the colors following the high density correction when a difference in at least one color reaches or exceeds the difference reference value.

Thus, the half-tone density correction is effected for all the colors following the high density correction when a difference in at least one color reaches or exceeds the difference reference value. Thus, not only can the time required for the density correction be shortened, but also a quantity of toner consumed for the density correction can be reduced.

The image density correction in the multi-color image forming apparatus is a crucial factor affecting a color balance. Hence, by effecting the half-tone density correction for all the colors even when the half-tone density correction is necessary for only one color, a color balance can be maintained in a reliable manner.

Consequently, it has become possible to provide an image forming apparatus which can maintain a density output of an entire color image at a specific level for any kind of images including solid, line, and half-tone, etc. while shortening the time required for the density correction and reducing a quantity of toner consumed for the density correction.

Embodiment 2

Figure 7:
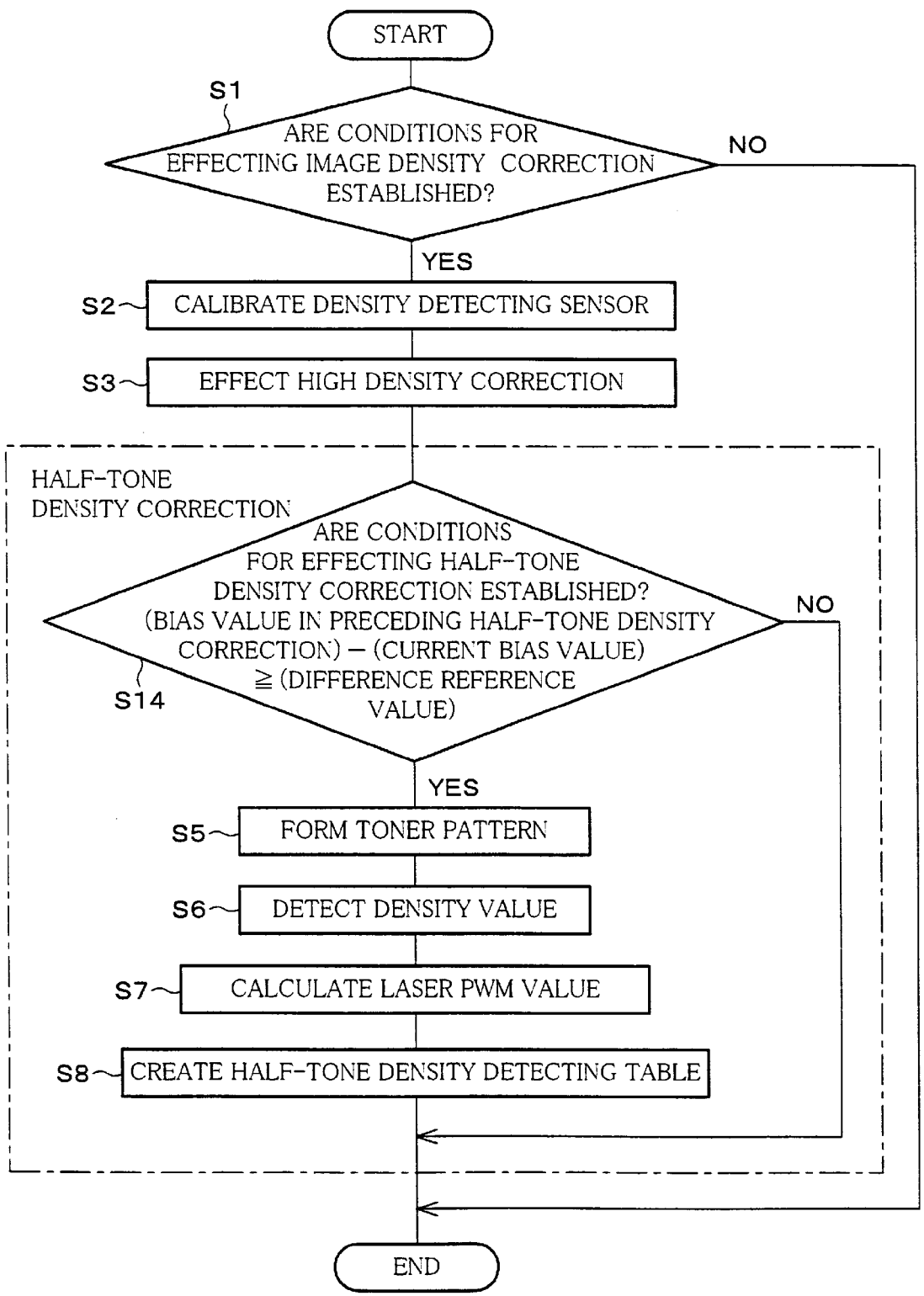
FIG. 7 is a view showing a color electrophotographic device in accordance with another embodiment of the present invention, showing a flowchart detailing actions where the result of the high density correction when the latest half-tone density correction was effected is adopted as the high density reference value and compared with the result of a current high density correction, and the half-tone density correction is effected following the high density correction only when a difference reaches or exceeds a preset difference reference value.
Figure 8:
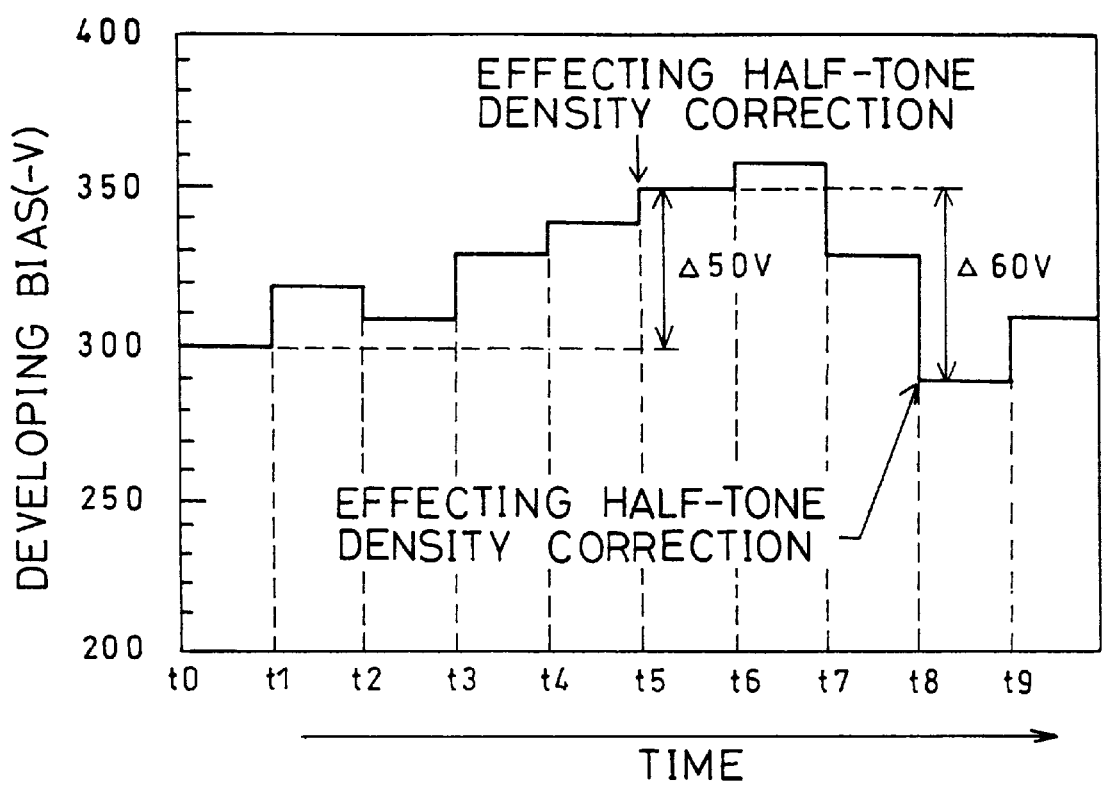
FIG. 8 is a view explaining timing at which the high density correction and half-tone density correction are effected in the color electrophotographic device.

Referring to FIGS. 7 and 8, the following description will describe another embodiment of the present invention. Hereinafter, like components are labeled with like reference numerals with respect to Embodiment 1, and the description of these components is not repeated for ease of explanation.

A color electrophotographic device of the present embodiment determines whether the half-tone density correction should be effect or not from the result of the highest density correction in the same manner as Embodiment 1 except that the difference reference value is set in a different manner.

In other words, in the color electrophotographic device of the present embodiment, the result of the high density correction when the latest half-tone density correction was effected is adopted as the high density reference value, and the high density reference value thus adopted is compared with the result of the current high density correction. Then, the half-tone density correction is effected following the high density correction only when a difference reaches or exceeds a preset difference reference value.

The image density correction by the above-arranged color electrophotographic device will be explained in detail with reference to the process control flowchart of FIG. 7. In the drawing, like actions are labeled with like step numerals with respect to FIG. 1 of Embodiment 1, and the description of these actions is not repeated for ease of explanation.

As shown in the drawing, after the high density correction is effected (S3), whether the half-tone density correction should be effected or not is judged based on the conditions for effecting the half-tone density correction (S14).

In the present embodiment, the high density developing bias voltage value set in the half-tone density correction when the latest half-tone density correction was effected is adopted as the high density reference value, and the half-tone density correction is effected only when a difference between the high density reference value thus adopted and the current developing bias voltage reaches or exceeds the difference reference value (herein ±50V).

The rest of the method for the half-tone density correction is identical with the flowchart of FIG. 1, and the explanation thereof is omitted for ease of explanation.

Consequently, by maintaining the high density at a specific level and automatically correcting the half-tone density, the density of an entire image can be maintained constantly at a specific level. Also, by determining whether the half-tone density correction should be effected or not based on the result of the highest density correction, the half-tone density correction is not effected when unnecessary, and therefore, can be effected efficiently. Hence, the time required for the density correction can be shortened and a quantity of toner consumed for the density correction can be reduced.

Next, the timing of the high density correction and half-tone density correction will be explained with reference to FIG. 8.

In FIG. 8, the developing bias voltage value of −300V is given as the high density reference value at a time t0 when the color electrophotographic device starts to rise. It should be appreciated that, at this initial stage, the half-tone density correction is also effected.

Then, the high density correction is effected at times t1, t2, t3, and t4, and the developing bias voltage values of −320V, −310V, −330V, and −340V are given as the high density reference values, respectively. Here, a difference from the developing bias voltage value of −300V adopted as the initial high density reference value is smaller than Δ50V. Thus, because the conditions that the difference reference value is 50V or greater are not satisfied, the half-tone density correction is not effected.

Then, the high density correction is effected again at a time t5, and the developing bias voltage is changed to −350V, yielding a difference of Δ50V from the developing bias voltage of −300V adopted as the initial high density reference value. Thus, because the conditions that the difference reference value is 50V or greater are satisfied, the half-tone density correction is effected.

Then, the high density correction is effected again at times t6 and t7, and a difference from the developing bias voltage value of −350 adopted as the high density reference value when the latest half-tone density correction was effected (at time t5) is smaller than Δ50. Thus, because the conditions that the difference reference value is 50V or greater are not satisfied, the half-tone density correction is not effected.

Then, the high density correction is effected again at time t8, and the developing bias voltage value is changed to −290V as a result. The correction result when the latest half-tone density correction was effected (at time t5) is adopted as the high density reference value, and Δ60 is given as a difference from the developing bias voltage value of −350 adopted as the high density reference value. Thus, because the conditions that the difference reference value is 50V or greater are satisfied, the half-tone density correction is effected.

As has been discussed, in the color electrophotographic device of the present embodiment, the image density correcting means compares the high density reference value with the result of the current high density correction, and effects the half-tone density correction following the high density correction only when the difference reaches or exceeds the preset difference reference value.

In other words, the half-tone density correction is not effected following each high density correction, but effected following the high density correction only when the initial high density reference value is compared with the result of the current high density correction and a difference reaches or exceeds the preset difference reference value.

Thus, because whether the half-tone density correction should be effected or not is judged based on the result of the high density correction, and the half-tone density correction is effected in accordance with the result, the time required for the density correction can be shortened and a quantity of toner consumed for the density correction can be reduced.

Also, whether the half-tone density correction should be effected or not is determined by comparing the high density reference value with the result of the current high density correction, and then judging whether the difference reaches or exceeds the preset difference reference value.

Thus, the half-tone density correction is effected only when there is a significant difference from the high density reference value. Hence, because the half-tone density correction is effected only when it is absolutely necessary, high efficiency can be attained.

Further, when the initial high density reference value is not changed and used in the later corrections, the density characteristics of the input image data is corrected in response to variance of the density characteristics caused by an applied voltage or a temperature rise during a series of charging, exposing, and developing actions based on the initial high density reference value of the toner of each color before the image is outputted.

Accordingly, the density characteristics of the input image data can be corrected in response to ideal density characteristics before the output.

Consequently, it has become possible to provide an image forming apparatus which can maintain a density output of an entire color image at a specific level for any kind of images including solid, line, and half-tone, etc. while shortening the time required for the density correction and reducing toner consumed for the density correction.

In addition, in the color electrophotographic device of the present embodiment, the image density correcting means adopts the result of the high density correction when the latest half-tone density correction was effected as the high density reference value, and compares the same with the result of the current high density correction. Then, the image density correcting means effects the half-tone density correction following the high density correction only when a difference reaches or exceeds the preset difference reference value.

In short, the result of the current high density correction is compared with the result of the high density correction when the latest half-tone density correction was effected, which is adopted as the high density reference value.

The half-tone density correction is not effected following each high density correction, but effected following the high density correction only when the result of the high density correction when the latest half-tone density correction was effected, which is adopted as the high density reference value, is compared with the result of the current high density correction and a difference reaches or exceeds the preset difference reference value.

Thus, because whether the half-tone density correction should be effected or not is judged based on the result of the high density correction, and the half-tone density correction is effected in accordance with the result, the time required for the density correction can be shortened and a quantity of toner consumed for the density correction can be reduced.

Also, whether the half-tone density correction should be effected or not is determined by comparing the result of the high density correction when the latest half-tone density correction was effected, which is adopted as the high density reference value, with the result of the current high density correction, and then judging whether the difference reaches or exceeds the preset difference reference value.

Thus, the half-tone density correction is effected only when the result of the current high density correction differs markedly from the high density reference value. Hence, because the half-tone density correction is effected only when it is absolutely necessary, high efficiency can be attained.

Further, the high density reference value is updated to the result of the high density correction when the latest half-tone density correction was effected. Thus, even if the toner quality is deteriorated, the density characteristics of the input image data is corrected in response to variance of the density characteristics caused by an applied voltage or a temperature rise during a series of charging, exposing, and developing actions in consideration of the deterioration of the toner quality.

Consequently, it has become possible to provide an image forming apparatus which can maintain a density output of an entire color image at a specific level for any kind of images including solid, line, and half-tone, etc. while shortening the time required for the density correction and reducing a quantity of toner consumed for the density correction.

In addition, in the color electrophotographic device of the present embodiment, in case of the density correction of a color image, the high density reference value is compared with the result of the current high density correction, and the half-tone density correction is effected for all the colors following the high density correction if the difference in at least one color reaches or exceeds the difference reference value.

Thus, because the half-tone density correction is effected for all the colors following the high density correction when the difference in at least one color reaches or exceeds the difference reference value, not only can the time required for the density correction be shortened, but also a quantity of toner consumed for the density correction can be reduced.

The image density correction in the multi-color image forming apparatus is a crucial factor affecting a color balance. Hence, by effecting the half-tone density correction for all the colors even when the half-tone density correction is necessary for only one color, a color balance can be maintained in a reliable manner.

Consequently, it has become possible to provide an image forming apparatus which can maintain a density output of an entire color image at a specific level for any kind of images including solid, line, and half-tone, etc. while shortening the time required for the density correction and reducing a quantity of toner consumed for the density correction.

Embodiment 3

Figure 9:
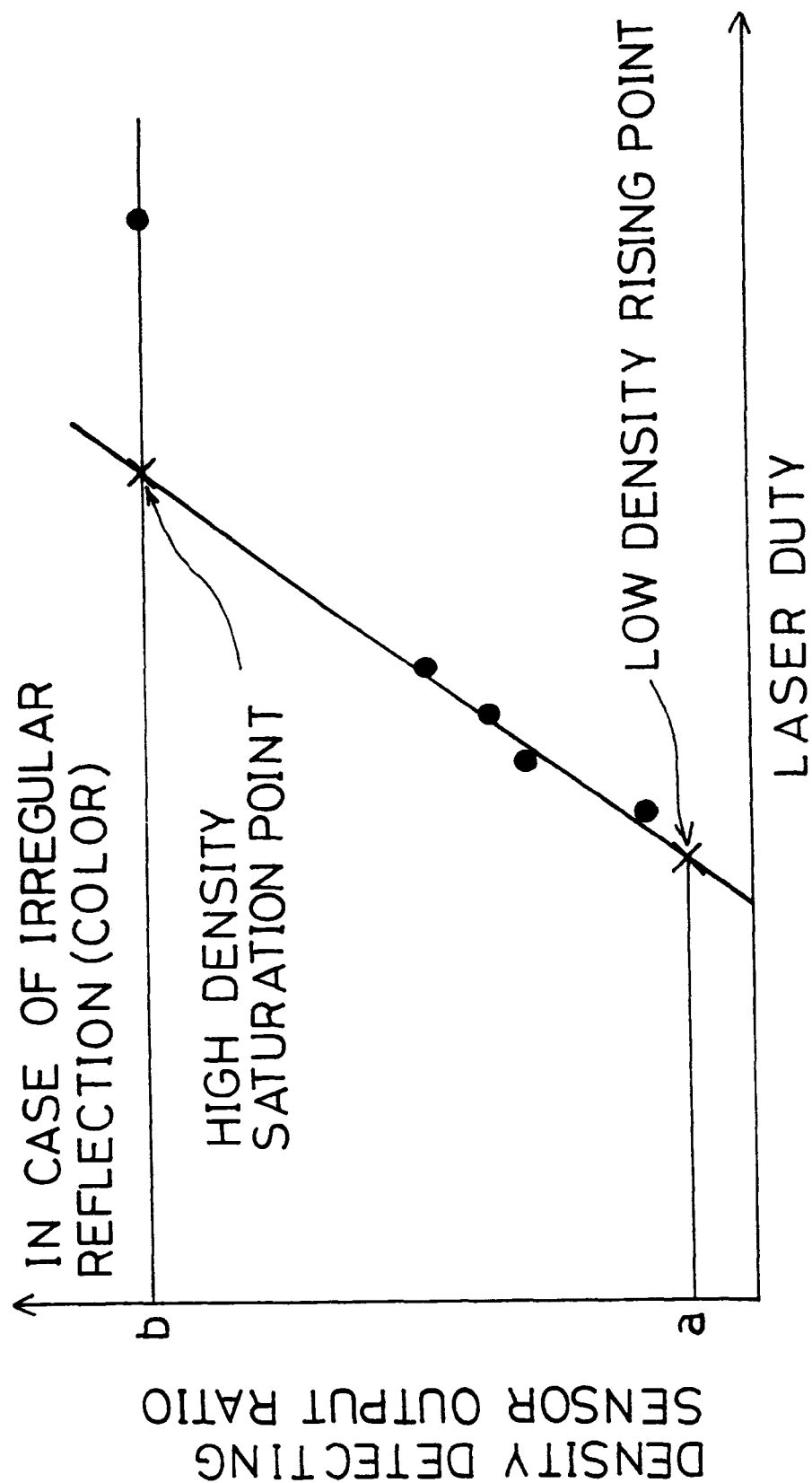
FIG. 9 is a view showing a color electrophotographic device in accordance with still another embodiment of the present invention, explaining a state in the first step where five kinds of half-tone density detecting toner patterns are formed to compute a low density rising point and a high density saturation point when effecting the half-tone density correction.
Figure 10:
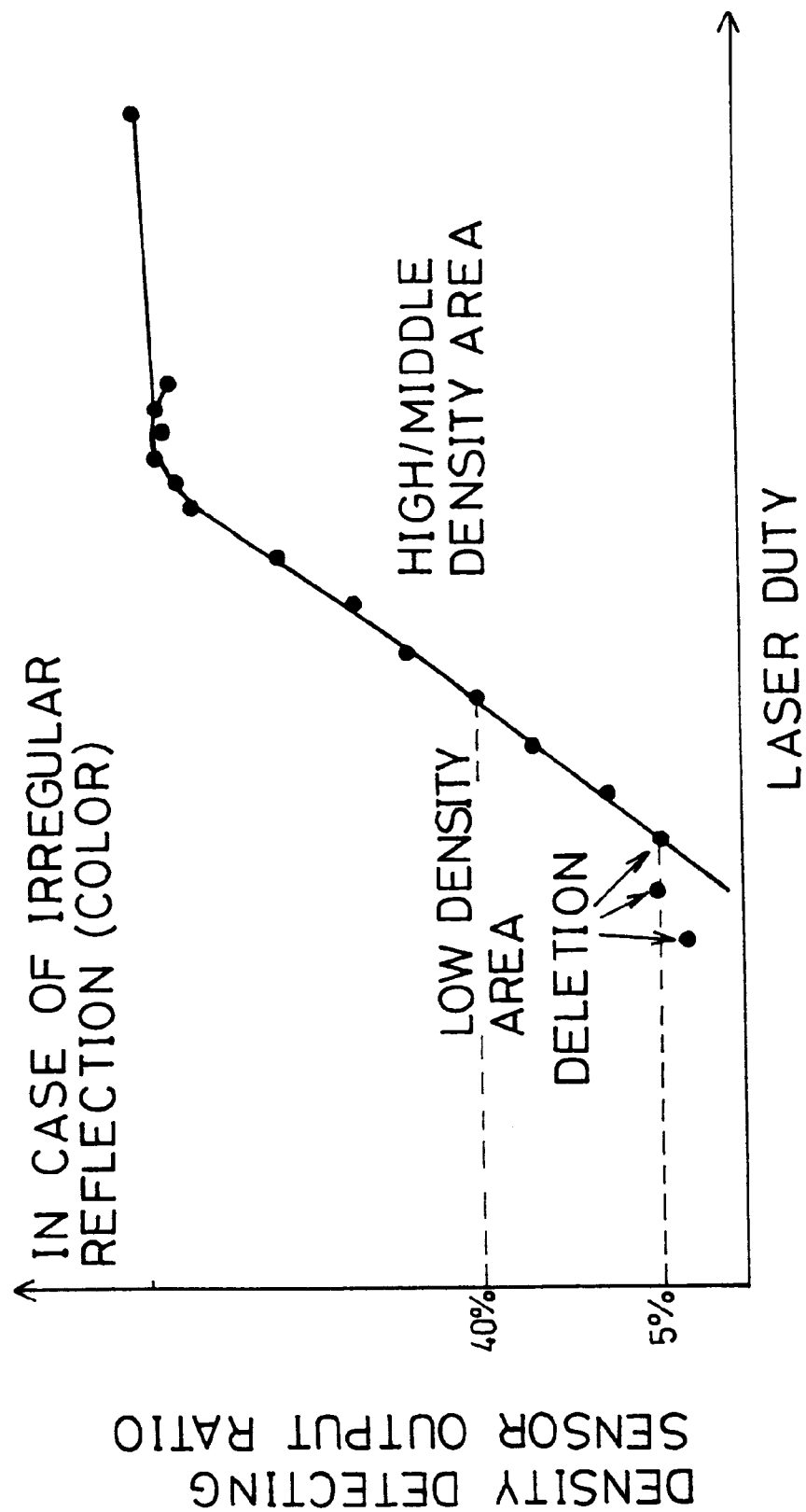
FIG. 10 is a view showing a state in the second step where 16 kinds of half-tone density detecting toner patterns are formed to collect data to approximate half-tone densities by means of least square method when effecting the half-tone density correction in the color electrophotographic device.

Referring to FIGS. 9 and 10, the following description will describe still another embodiment of the present invention. Hereinafter, like components are labeled with like reference numerals with respect to Embodiments 1 and 2, and the description of these components is not repeated for ease of explanation.

The present embodiment will describe a correcting method of the half-tone density.

The half-tone density correction is composed of two steps: first and second steps. In the first step, a low density rising point and a high density saturation point are found. In the second step, detailed data of these points are collected for approximation.

More specifically, in the first step, five kinds of half-tone density detecting toner patterns each having different density are formed on the transfer belt 7 through a series of the charging by changing a laser duty of the exposing device 3, exposing, developing, and transferring actions. The laser duty values are set in a range from 0 to 255, and in the present embodiment, set to 31, 47, 63, 79, and 255, for example.

Then, these half-tone density detecting toner patterns are sequentially checked by the density detecting sensor 10, and as shown in FIG. 9, the low density rising point and high density saturation point are computed from the checking results.

The low density rising point and high density saturation point are computed in the following manner.

In FIG. 9, three following Equations are found:
(1) Y=a, a straight line passing an output ratio a of the density detecting sensor 10 to give the laser duty of 0;
(2) Y=b, a straight line passing an output ratio b of the density detecting sensor 10 to give the laser duty of 255; and
(3) y=cx+d, a straight line found by approximation by the method of least squares at four laser duties of 31, 47, 63, and 79.

The output ratio a of the density detecting sensor 10 to give the laser duty 0 is a fixed value found without collecting data.

Then, an intersection of the straight line Y=a and the straight line Y=cx+d is assumed as the low density rising point, and the intersection of the straight line Y=b and the straight line y=cx+d is assumed as the high density saturation point.

Then, the second step is conducted.

In the second step, 16 kinds of half-tone density detecting toner patterns are sequentially formed on the transfer belt 7, and detailed data of the points found in the first step are collected. For example, the data between the straight lines Y=a and Y=b are collected every pitch, that is, a laser duty of 6. Thus, one or more of these 16 kinds of half-tone density detecting toner patterns may be the same as the laser duties of 31, 47, 63, 79 and 255 found in the first step. The pitches of the laser duty is narrower around the inflection point used as the high density saturation point.

In the second step, as shown in FIG. 10, data is approximated for each of the low density area and high/middle density area, and the results are joined later. Herein, an area having the density detecting sensor output ratio of up to 40% is used as the low density area and the rest is used as the high/middle density area. However, the areas are not necessarily divided in the above manner.

In the present embodiment, 5% is given as the reference value in the low density area, for example, and data is approximated after the data of the half-tone density detecting toner pattern(s) showing less than 5% is deleted, so that an unstable sensor value at or around the low density rising point will not give any adverse effect to an output image.

Thus, in the present embodiment, approximation is conducted for the data of the half-tone density detecting toner patterns from the point at which the sensor values of the density detecting sensor 10 start to rise continuously, so that irregularity of an approximation line can be reduced.

Next, the half-tone density curve thus obtained is compared with a target (initial) value of FIG. 5 and a correction quantity is computed, based on which the half-tone table is updated.

Consequently, the half-tone density can be corrected in a short time and a high-quality image can be outputted.

Figure 4B:
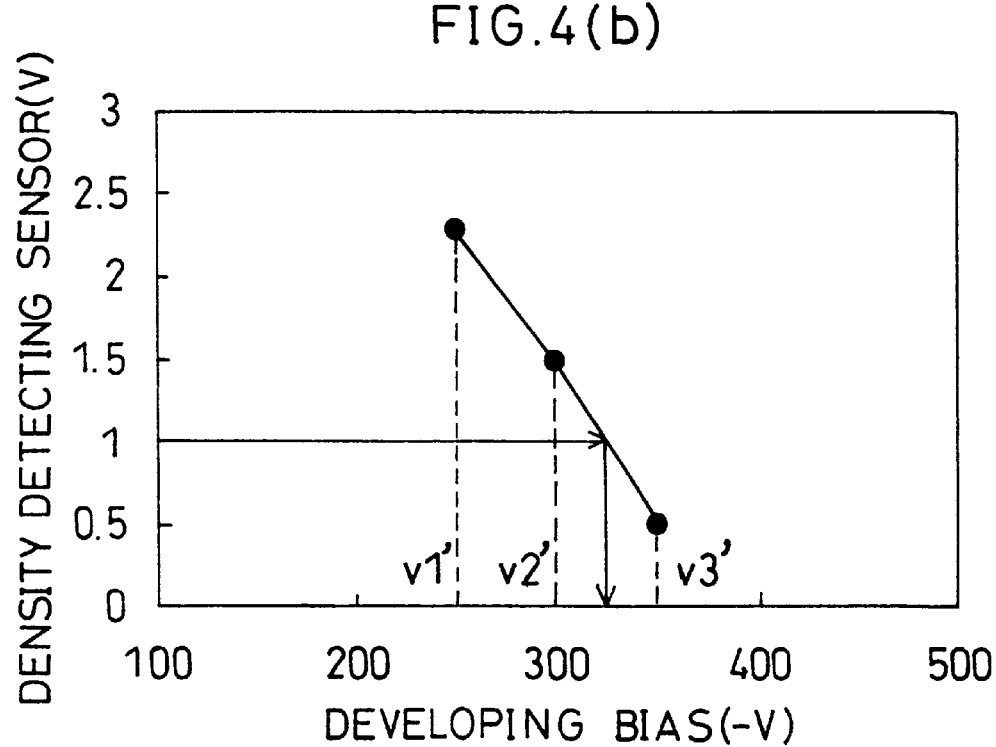
FIG. 4(b) is a view explaining a high density correction of a monochromatic image when the density correction is effected by the density detecting sensor in the color electrophotographic device.

FIGS. 9 and 10 show a relation between the laser duty and the output ratio of irregular reflection of the density detecting sensor 10 for a color image, and for this reason, the straight line is upward to the right. In case of a monochromatic image, the detection value of regular reflection from the density detecting sensor 10 is used, and for this reason, the straight line is downward to the right as shown in FIG. 4(b)

As has been discussed, in the color electrophotographic device of the present embodiment, the image density correcting means effects the half-tone density correction by forming a plurality of half-tone density detecting toner patterns having different density levels from the low density area to near the high density area and comparing the same with the half-tone density reference value. On the other hand, the image density correcting means deletes any detected value equal to or below the preset low density area deleting reference value in the low density area, and effects the correction by a value found by linear approximation using the rest of the detected values.

In other words, when the half-tone density correction is effected by comparison with the half-tone density reference value, a plurality of half-tone density detecting toner patterns having different density levels from the low density area to near the high density area are formed, and these toner patterns are detected and a value found by approximation is used for the correction.

The detected values in the low density area generally disturbed, and therefore, are not readily linear-approximated. Thus, in the present embodiment, any detected value equal to or below the preset low density area deleting reference value is deleted in the low density area, and the linear approximation is conducted using the rest of the detected values.

Thus, by deleting the detected value(s) equal to or below the low density area deleting reference value, only the detected values appropriate for linear approximation can be used, thereby realizing more accurate approximation.

In addition, because the value found by the linear approximation is used, no incorrect density conversion table is created.

Further, a required time can be shortened considerably compared with a case of creating a density conversion table covering all the levels by means of interpolation.

Consequently, it has become possible to provide an image forming apparatus which can maintain a density output of an entire color image at a specific level for any kind of images including solid, line, and half-tone, etc. while shortening the time required for the density correction and reducing a quantity of toner consumed for the density correction.

On the other hand, a problem arises when deciding how the low density area deleting reference value is set to use an adequate detected value for linear approximation.

In the present embodiment, however, the reflection point of detected values when the laser output is changed gradually from the lower end to the higher end is adopted. More specifically, in case of a color image, a point at which the detected values start to rise continuously is adopted, and in case of a monochromatic image, a point at which the detected values start to drop continuously is adopted.

Accordingly, the detected values in the low density area which are not readily linear-approximated can be deleted in a reliable manner, and the detected values appropriate for the linear approximation can be left as many as possible.

Consequently, it has become possible to provide an image forming apparatus which can maintain a density output of an entire color image at a specific level for any kind of images including solid, line, and half-tone, etc. while shortening the time required for the density correction and reducing a quantity of toner consumed for the density correction.

Embodiment 4

Referring to the accompanying drawings, the following description will describe still another embodiment of the present invention. Hereinafter, like components are labeled with like reference numerals with respect to Embodiments 1 through 3, and the description of these components is not repeated for ease of explanation.

In a color electrophotographic device of the present embodiment, unillustrated image density correcting means compares the high density reference value with the result of the current high density correction for each color, and effects the half-tone density correction only when a total of the differences in all the colors reaches or exceeds a preset total difference reference value.

In other words, as shown in FIGS. 4(a) and 4(b), the high density correction is effected to correct the developing bias potential for each of Y, M, C, and Bk. Here, 300V is given as the high density reference value for the developing bias potential for each color.

In the present embodiment, 100V is given as the total difference reference value as a total of the differences between the correction results of the developing bias and the high density reference value for all the four colors, and the half-tone density correction is effected only when the total difference reference value reaches or exceeds 100V.

For example, assume that the developing bias potential for each color is corrected as follows in the current high density correction: Y=325V, M=345V, C=320V, and Bk=315V, and differences from the high density reference value are: 25V, 45V, 20V, and 15V, respectively. Then, it is predicted that a color balance is changed and the half-tone density correction is necessary.

Conventionally, the half-tone density correction is effected if a difference between the developing bias and the high density reference value exceeds 50V at least in one color.

Thus, in the conventional method, because the difference is smaller than 50V in each color in the above example, the correction is not effected.

On the other hand, in the present embodiment, the half-tone density correction is effected, because the total of the differences in all the four colors is 105V and exceeds the total difference reference value of 100V.

Hence, by determining whether the half-tone density correction should be effected or not based on the total of correction quantities of all the colors, a change in a color balance of the image can be determined more accurately.

In this manner, in the color electrophotographic device of the present embodiment, the unillustrated image density correcting means compares the high density reference value with the result of the current high density correction for each color, and effects the half-tone density correction following the high density correction only when the total of differences in all the colors reaches or exceeds the preset total difference reference value.

Thus, by maintaining the high density at a specific level and correcting the half-tone density automatically, the density of an entire image can be maintained constantly at a specific level.

In addition, by determining whether the half-tone density correction should be effected or not by the total of the correction quantities in the high density correction, not only a change in the half-tone density of a single color, but also a change of a color balance of a multi-color image can be determined more accurately.

Consequently, the half-tone density correction is not effected when unnecessary, and therefore, can be effected efficiently in consideration of all the colors, thereby shortening the time required for the density correction and reducing a quantity of toner consumed for the density correction while improving the image quality.

Embodiment 5

Referring to the accompanying drawings, the following description will describe still another embodiment of the present invention. Hereinafter, like components are labeled with like reference numerals with respect to Embodiments 1 through 4, and the description of these components is not repeated for ease of explanation.

In a color electrophotographic device of the present embodiment, unillustrated image density correcting means compares the high density reference value with the result of the current high density correction for each color, and effects the half-tone density correction following the high density correction only when a difference of a monochromatic color alone reaches or exceeds a monochromatic difference reference value, or a total of differences in all the colors excluding the monochromatic color reaches or exceeds a preset color total difference reference value.

In other words, as shown in FIGS. 4(a) and 4(b), the high density correction is effected and the developing bias potential is corrected for each of colors Y, M, C, and Bk. Here, 300V is given as the high density reference value of the developing bias potential for each color.

Then, in the present embodiment, the half-tone density correction is effected if a difference between the high density reference value and the correction result of the developing bias for Bk reaches or exceeds 40V which is given as the monochromatic difference reference value, or a total of differences between the high density reference values and the correction results of the developing bias for the rest of three colors reaches or exceeds 80V which is given as the color total difference reference value.

For example, assume that the developing bias potential for each color is corrected as follows in the current high density correction: Y=325V, M=345V, C=320V, and Bk=315V. Then, the difference from the high density reference value for Bk is 15V and the total differences in the rest of three colors is 90V.

Thus, because the total of the differences in three colors exceeds the color total difference reference value of 80V, the half-tone density correction is effected for the three colors alone.

As has been discussed, in the color electrophotographic device of the present embodiment, the unillustrated image density correcting means compares the high density reference value with the result of the current high density correction for each color, and effects the half-tone density correction following the high density correction only when a difference of a monochromatic color alone reaches or exceeds the monochromatic difference reference value, or a total of differences of colors excluding the monochromatic color reaches or exceeds the preset color total difference reference value.

Thus, by maintaining the high density at a specific level and correcting the half-tone density automatically, the density of an entire image can be maintained constantly at a specific level.

Also, by determining whether the half-tone density correction should be effected or not for the monochromatic color and the rest of the colors separately, the density correction is effected separately when the half-tone density of a color image is changed and when the half-tone density of a monochromatic image is changed.

Consequently, the half-tone density correction is effected efficiently only when necessary for either the monochromatic color or the rest of the colors by considering the monochromatic color or the reset of the colors, thereby shortening the time required for the density correction and reducing a quantity of toner consumed for the density correction while improving the image quality.

Embodiment 6

Figure 11:
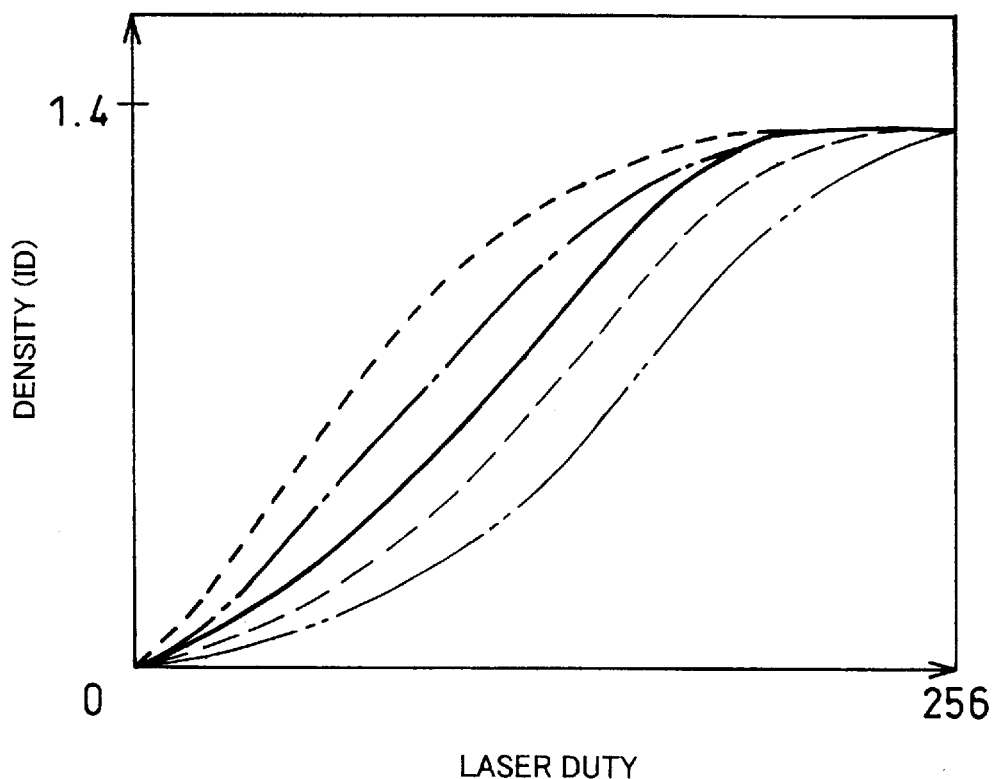
FIG. 11 is a view showing a color electrophotographic device in accordance with still another embodiment of the present invention, explaining variance in density (ID: Image Density) in each color when the half-tone density correction is effected following the high density correction only when a total of absolute values of differences of all colors reaches or exceeds a preset total absolute difference reference value.
Figure 12:
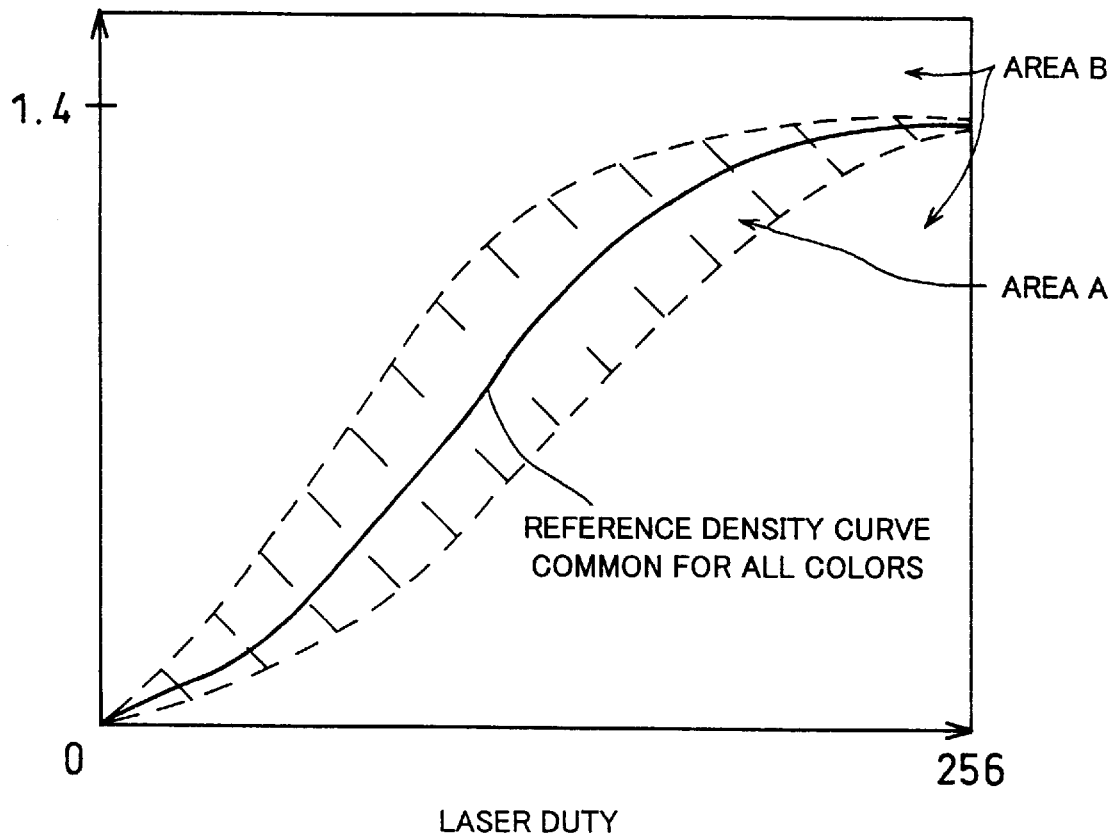
FIG. 12 is a view showing a conventional color electrophotographic device, explaining a concept of a density correction judgment.
Figure 13:
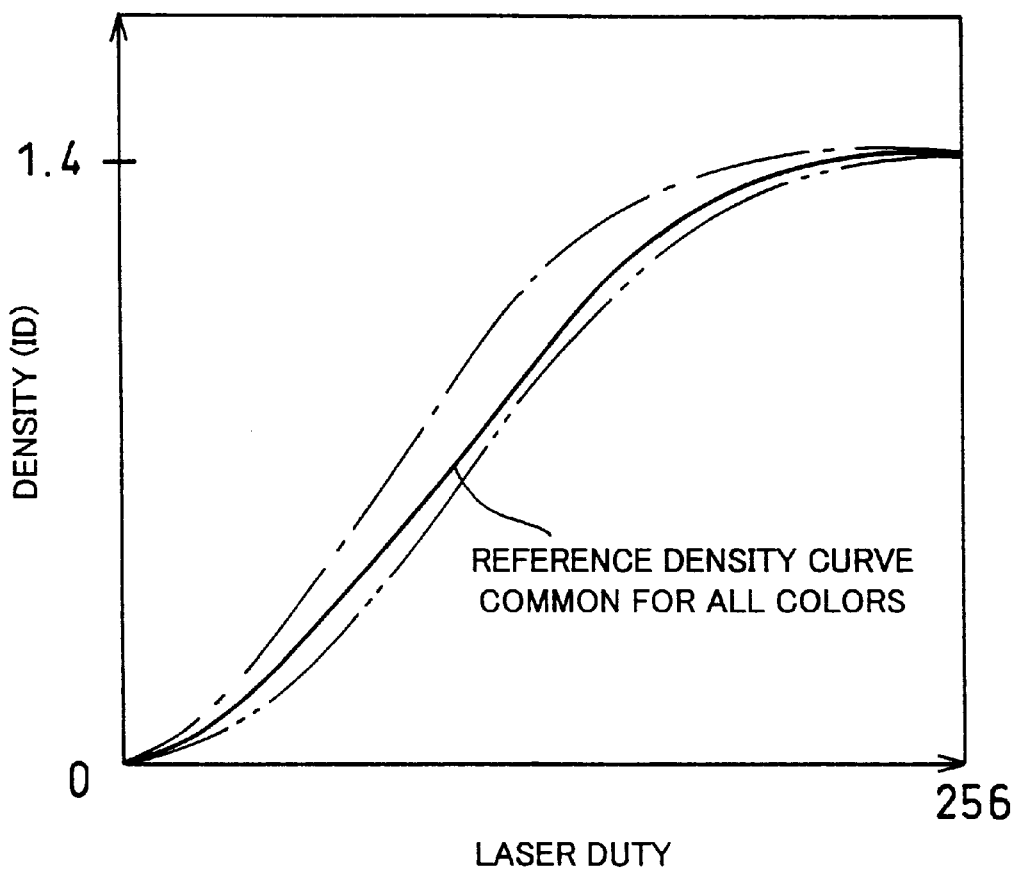
FIG. 13 is a view explaining a change of a density curve when a member is replaced in the color electrophotographic device.

Referring to FIG. 11, the following description will describe still another embodiment of the present invention. Hereinafter, like components are labeled with like reference numerals with respect to Embodiments 1 through 5, and the description of these components is not repeated for ease of explanation.

In a color electrophotographic device of the present embodiment, unillustrated image density correcting means compares the high density reference value with the result of the current high density correction for each color, and effects the half-tone density correction following the high density correction only when a total of absolute values of the differences of all the colors reaches or exceeds a preset total absolute difference reference value.

In other words, as shown in FIGS. 4(a) and 4(b), the high density correction is effected and the developing bias potential is corrected for each of colors Y, M, C, and Bk. Here, 300V is given as the high density reference value of the developing bias potential for each color.

Then, in the present embodiment, the half-tone density correction is effected when a total of the absolute values of the differences between the reference value from the correction results of the developing bias for all the four colors reaches or exceeds 100V given as the absolute difference reference value.

For example, assume that the developing bias potential for each color is corrected as follows in the current high density correction: Y=325V, M=345V, C=280V, and Bk=285V, then the differences from the high density reference value are 25V, 45V, −20V, and −15V, respectively.

Accordingly, it is predicted that the density of an entire image is changed as shown in FIG. 11, and if the total of differences is computed in the same manner as Embodiment 4, a total of 35V is obtained and the half-tone density correction is not effected.

On the other hand, in the present embodiment, a total of the absolute values of the differences from the high density reference value is computed, and a total of 105V is obtained. Because the total of the absolute difference values of four colors exceeds 100V given as the absolute total difference reference value, the half-tone density reference value is effected for each color.

As has been discussed, in the color electrophotographic device of the present embodiment, the unillustrated image density correcting means compares the high density reference value with the result of the current high density correction for each color, and effects the half-tone density correction following the high density correction only when a total of absolute values of the differences of all the colors reaches or exceeds a preset total absolute difference reference value.

Thus, by maintaining the high density at a specific level and correcting the half-tone density automatically, the density of an entire image can be maintained constantly at a specific level.

Also, even when the correction result of each color has a different direction (negative or positive direction) with respect to the high density reference value when a total of correction quantities in the high density correction for all the colors is found, by computing a total of the absolute values of the differences from the high density reference value, a change in a color balance of a multi-color image can be judged in a reliable manner.

Thus, because the half-tone density correction is not effected when unnecessary, and therefore, can be effected efficiently in consideration of all the colors, not only can the time required for the density correction be shortened, but also a quantity of toner consumed for the density correction can be reduced while improving the image quality.

As has been discussed, in order to maintain an image density at a specific level, an image forming apparatus of the present invention is an image forming apparatus having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, arranged in such a manner that:

said image density correcting means adopts a result of a preceding high density correction as said high density reference value, compares said high density reference value with a result of a current high density correction, and effects the half-tone density correction following the high density correction only when a difference reaches or exceeds a preset difference reference value.

According to the above arrangement, in order to maintain the image density at a specific level, the followings are carried out by the image density correcting means. That is, a predetermined high density detecting toner pattern is formed on the photosensitive body for the high density correction. Then, a value detected from the high density detecting toner pattern by the reflection sensor is compared with the high density reference value, and a quantity of the high density correction is determined. Also, a predetermined half-tone density detecting toner pattern is formed on the photosensitive body for the half-tone density correction. Then, a value detected from the half-tone density detecting toner pattern by the reflection sensor is compared with the half-tone density reference value, and a quantity of the half-tone density correction is determined.

Consequently, not only can the high density be maintained at a specific level, but also a density of an entire image can be constantly maintained at a specific level by automatically correcting the half-tone density.

Here, the image density correcting means adopts the result of the preceding high density correction as the high density reference value, compares the same with the result of a current high density correction, and effects the half-tone density correction following the high density correction only when a difference reaches or exceeds the preset difference reference value.

In other words, the high density reference value is updated to the result of the latest high density correction each time the high density correction is effected, and the result of the current high density correction is compared with the updated high density reference value.

On the other hand, the half-tone density correction is not effected following each high density correction. That is, the updated high density reference value is compared with the result of the current high density correction, and the half-tone density correction is effected only when a difference reaches or exceeds the preset difference reference value.

As a result, whether the half-tone density correction should be effected or not is judged based on the result of the high density correction, and the half-tone density correction is effected in accordance with the result. Thus, not only can the time required for the density correction be shortened, but also a quantity of toner consumed for the density correction can be reduced.

Whether the half-tone density correction should be effected or not is judged by comparing the updated high density reference value with the result of the current high density correction, and then judging whether a difference reaches or exceeds the preset difference reference value.

Thus, the half-tone density correction is effected only when there is a significant difference from the updated high density reference value. Thus, because the half-tone density correction is effected only when it is absolutely necessary, high efficiency can be attained.

Further, because the high density reference value is updated each time the high density correction is effected, the density characteristics of the input image data can be corrected in response to variance of the density characteristics caused by an applied voltage or a temperature rise during a series of charging, exposing, and developing actions in the electrophotographic process.

Consequently, it has become possible to provide an image forming apparatus which can maintain a density output of an entire color image at a specific level for any kind of images including solid, line, and half-tone, etc. while shortening the time required for the density correction and reducing a quantity of toner consumed for the density correction.

As has been discussed, in order to maintain an image density at a specific level, an image forming device of the present invention is an image forming device having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, arranged in such a manner that:

said image density correcting means compares said high density reference value with a result of a current high density correction, and effects the half-tone density correction following the high density correction only when a difference reaches or exceeds a preset difference reference value.

According to the above invention, the image density correcting means compares the high density reference value with the result of the current high density correction, and effects the half-tone density correction following the high density correction only when a difference reaches or exceeds the preset difference reference value.

In other words, the half-tone density correction is not effected following each high density correction. The half-tone density correction is effected following the high density correction only when the high density reference value is compared with the result of the current high density correction, and a difference reaches or exceeds the preset difference reference value.

As a result, whether the half-tone density correction should be effected or not is judged based on the result of the high density correction, and the half-tone density correction is effected in accordance with the result. Thus, not only can the time required for the density correction be shortened, but also a quantity of toner consumed for the density correction can be reduced.

Whether the half-tone density correction should be effected or not is judged by comparing the high density reference value with the result of the current high density correction, and then judging whether a difference reaches or exceeds the preset difference reference value.

Thus, the half-tone density correction is effected only when there is a significant difference from the high density reference value. Thus, because the half-tone density correction is effected only when it is absolutely necessary, high efficiency can be attained.

Further, in case that the high density reference value is not changed, the density characteristics of the input image data can be corrected in response to variance of the density characteristics caused by an applied voltage or a temperature rise during a series of charging, exposing, and developing actions based on the initial high density reference value of the toner.

Accordingly, the density characteristics of the input image data can be corrected in response to ideal density characteristics before the output.

Consequently, it has become possible to provide an image forming apparatus which can maintain a density output of an entire color image at a specific level for any kind of images including solid, line, and half-tone, etc. while shortening the time required for the density correction and reducing toner consumed for the density correction.

As has been discussed, the image forming apparatus of the present invention may be arranged in such a manner that said image density correcting means adopts a result of a high density correction when a latest half-tone density correction was effected as said high density reference value, compares said high density reference value with a result of a current high density correction, and effects the half-tone density correction following the high density correction only when a difference reaches or exceeds said preset difference reference value.

According to the above invention, the image density correcting means adopts the result of the high density correction when the latest half-tone density correction was effected as the high density reference value, compares the same with the result of the current high density correction, and effects the half-tone density correction following the high density correction only when a difference reaches or exceeds the preset difference reference value.

In short, the result of a current high density correction is compared with the high density reference value which is the result of the high density correction when the latest half-tone density correction was effected.

Also, the half-tone density correction is not effected following each high density correction. The half-tone density correction is effected only when the high density reference value which is the result of the high density correction when the latest half-tone density correction was effected is compared with the result of a current high density correction, and a difference reaches of exceeds the preset difference reference value.

As a result, whether the half-tone density correction should be effected or not is judged based on the result of the high density correction, and the half-tone density correction is effected in accordance with the result. Thus, not only can the time required for the density correction be shortened, but also a quantity of toner consumed for the density correction can be reduced.

Also, whether the half-tone density correction should be effected or not is determined by comparing the high density reference value which is a result of the high density correction when the latest half-tone density correction was effected with the result of a current high density correction, and then judging whether a difference reaches of exceeds the preset difference reference value.

Thus, the half-tone density correction is effected only when there is a significant difference from the high density reference value. Hence, because the half-tone density correction is effected only when it is absolutely necessary, high efficiency can be attained.

Further, the high density reference value is updated to the result of the high density correction when the latest half-tone density correction was effected. Thus, even if the toner quality is deteriorated, the density characteristics of the input image data can be corrected in response to variance of the density characteristics caused by an applied voltage or a temperature rise during a series of charging, exposing, and developing actions in the electrophotographic process in accordance with the deterioration of the toner quality.

Consequently, it has become possible to provide an image forming apparatus which can maintain a density output of an entire color image at a specific level for any kind of images including solid, line, and half-tone, etc. while shortening the time required for the density correction and reducing a quantity of toner consumed for the density correction.

The image forming apparatus of the present invention may be arranged in such a manner that, in case of the high density correction of a color image, said image density correcting means compares said high density reference value with a result of a current high density correction, and effects the half-tone density correction of all colors following the high density correction when a difference in at least one color reaches or exceeds said difference reference value.

Thus, in case of a color image, if the half-tone density correction is effected for all the colors including Y (Yellow), M (Magenta), C (Cyan), and Bk (Black) each time the high density correction is effected, the density correction time is extended far longer than the density correction time for a monochromatic image. Thus, the user is kept waiting for a considerable time and such a device is not user-friendly.

In the present invention, however, the image density correcting means compares the high density reference value with the result of the current high density correction when effecting the density correction of a color image, and effects the half-tone density correction for all the colors following the high density correction when a difference in at least one color reaches or exceeds the difference reference value.

Thus, the half-tone density correction is effected for all the colors following the high density correction when a difference in at least one color reaches or exceeds the difference reference value. Hence, not only can the time required for the density correction be shortened, but also a quantity of toner consumed for the density correction can be reduced.

The image density correction by the multi-color image forming apparatus is a crucial factor affecting a color balance. Hence, by effecting the half-tone density correction for all the colors even when the half-tone density correction is necessary for only one color, a color balance can be maintained in a reliable manner.

Consequently, it has become possible to provide an image forming apparatus which can maintain a density output of an entire color image at a specific level for any kind of images including solid, line, and half-tone, etc. while shortening the time required for the density correction and reducing a quantity of toner consumed for the density correction.

As has been discussed, in order to maintain an image density at a specific level, an image forming apparatus of the present invention is an image forming apparatus having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, arranged in such a manner that:

said image density detecting means forms a plurality of half-tone density detecting toner patterns each having a different density level, compares a density of each of said half-tone density detecting toner patterns with said half-tone density reference value, effects the half-tone density correction with linear approximation values of a plurality of detected values after deleting any detected value which is equal to or smaller than a preset low density area deleting reference value in a low density area.

According to the above invention, in effecting the half-tone density correction, the image density correcting means forms a plurality of half-tone density detecting toner patterns having different density levels from the low density area to near the high density area and compares the same with the half-tone density reference value, while deleting any detected value equal to or below the preset low density area deleting reference value in the low density area to effect the correction by linear approximation values of the rest of the detected values.

In other words, when the half-tone density correction is effected by comparison with the half-tone density reference value, a plurality of half-tone density detecting toner patterns having different density levels from the low density area to near the high density area are formed, and values detected from these toner patterns are linear-approximated for use in the correction.

The detected values in the low density area generally disturbed, and therefore, are not readily linear-approximated. Thus, in the present invention, any detected value equal to or below the preset low density area deleting reference value is deleted in the low density area, and the linear approximation is conducted using the rest of the detected values.

Thus, because only the detected values appropriate for linear approximation are used by deleting those equal to or below the low density area deleting reference value, approximation accuracy can be upgraded.

In addition, because the linear approximation values are used, no incorrect density conversion table is created.

Further, a required time can be shortened markedly compared with a case of creating a density conversion table covering all the levels by means of interpolation.

Consequently, it has become possible to provide an image forming apparatus which can maintain a density output of an entire color image at a specific level for any kind of images including solid, line, and half-tone, etc. accurately in a reliable manner while shortening the time required for the density correction and reducing a quantity of toner consumed for the density correction.

As has been discussed, the image forming apparatus of the present invention may be arranged in such a manner that said image density correcting means adopts, as said low density area deleting reference value used for linear approximation in said low density area, an inflection point of detected values when a laser output is gradually changed from a lower end to a higher end.

Here, a problem arises when deciding how the low density area deleting reference value is set to use an adequate detected value for linear approximation.

Thus, in the present invention, the image density detecting means adopts the reflection points of detected values when the laser output is changed gradually from the lower end to the higher end as the low density area deleting reference value. More specifically, in case of a color image, a point at which the detected values start to rise continuously is adopted, and in case of a monochromatic image, a point at which the detected values start to drop continuously is adopted.

Consequently, the detected values in the low density area which are not readily linear-approximated can be deleted in a reliable manner, and the detected values appropriate for the linear approximation can be left as many as possible.

Hence, it has become possible to provide an image forming apparatus which can maintain a density output of an entire color image at a specific level for any kind of images including solid, line, and half-tone, etc. efficiently and accurately in a reliable manner while shortening the time required for the density correction and reducing a quantity of toner consumed for the density correction.

As has been discussed, in order to maintain an image density at a specific level, an image forming apparatus of the present invention is an image forming apparatus having image density correcting means for effecting (1) a high density correction, by which a predetermined high density detecting toner pattern is formed on a photosensitive body, and a quantity of high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of half-tone density correction is determined by comparing a value detected from said half-tone density detecting toner pattern by the reflection sensor with a half-tone density reference value, arranged in such a manner that:

said image density correcting means compares said high density reference value with a result of a current high density correction for each color, and effects the half-tone density correction following the high density correction only when a total of differences in all colors reaches or exceeds a total difference reference value.

According to the above invention, the image density correcting means compares the high density reference value with the result of the current high density correction for each color, and effects the half-tone density correction following the high density correction only when the total of differences in all the colors reaches or exceeds the preset total difference reference value.

Thus, by maintaining the high density at a specific level and correcting the half-tone density automatically, the density of an entire image can be maintained constantly at a specific level.

In addition, by determining whether the half-tone density correction should be effected or not by a total quantity of correction of all the colors in the high density correction, not only a change in the half-tone density of a single color, but also a change of a color balance of a multi-color image can be determined more accurately.

Consequently, the half-tone density correction is not effect when unnecessary, and therefore, can be effected efficiently in consideration of all the colors, thereby shortening the time required for the density correction time and reducing a quantity of toner consumed for the density correction while improving the image quality.

As has been discussed, in order to maintain an image density at a specific level, an image forming apparatus of the present invention is an image forming apparatus having image density correcting means for effecting (1) a high density correction, by which a predetermined high density detecting toner pattern is formed on a photosensitive body, and a quantity of high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of half-tone density correction is determined by comparing a value detected from said half-tone density detecting toner pattern by the reflection sensor with a half-tone density reference value, arranged in such a manner that:

said image density correcting means compares said high density reference value with a current high density correction for each color, and effects the half-tone density correction following the high density correction only when a difference in a monochromatic color reaches or exceeds a preset monochromatic difference reference value, or a total of differences in all colors excluding the monochromatic color reaches or exceeds a preset color total difference reference value.

According to the above invention, the image density correcting means compares the high density reference value with the result of the current high density correction for each color, and effects the half-tone density correction following the high density correction only when a difference of a monochromatic color alone reaches or exceeds the monochromatic difference reference value, or a total of difference in all the colors excluding the monochromatic color reaches or exceeds the preset color total difference reference value.

Thus, by maintaining the high density at a specific level and correcting the half-tone density automatically, the density of an entire image can be maintained constantly at a specific level.

Also, by determining whether the half-tone density correction should be effected or not for the monochromatic color and the rest of the colors separately, the density correction is effected separately when the half-tone density of a color image is changed and when the half-tone density of a monochromatic image is changed.

Consequently, the half-tone density correction is effected effectively only when necessary for either the monochromatic color or the rest of the colors by respectively considering the monochromatic color or the reset of the colors, thereby shortening the time required for the density correction and reducing a quantity of toner consumed for the density correction while improving the image quality.

As has been discussed, in order to maintain an image density at a specific level, an image forming apparatus of the present invention is an image forming apparatus having image density correcting means for effecting (1) a high density correction, by which a predetermined high density detecting toner pattern is formed on a photosensitive body, and a quantity of high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of half-tone density correction is determined by comparing a value detected from said half-tone density detecting toner pattern by the reflection sensor with a half-tone density reference value, arranged in such a manner that:

said image density correcting means compares said high density reference value with a result of a current high density correction for each color, and effects the half-tone density correction following the high density correction only when a total of absolute values of differences in all colors reaches or exceeds a preset absolute value total difference reference value.

According to the above invention, the image density correcting means compares the high density reference value with the result of the current high density correction for each color, and effects the half-tone density correction following the high density correction only when a total of absolute values of the differences in all the colors reaches or exceeds a preset total absolute difference reference value.

Thus, by maintaining the high density at a specific level and correcting the half-tone density automatically, the density of an entire image can be maintained constantly at a specific level.

Also, in case that the correction result of each color has a different direction (negative or positive direction) with respect to the high density reference value when computing a total quantity of correction in the high density correction for all the colors, by computing a total of the absolute values of the differences from the high density reference value, a change in a color balance of a multi-color image can be judged in a reliable manner.

Thus, the half-tone density correction is not effected when unnecessary, and therefore, can be effected efficiently in consideration of all the colors. Hence, not only can the time required for the density correction be shortened, but also a quantity of toner consumed for the density correction can be reduced while improving the image quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus comprising:
   a density detecting sensor for detecting a density of a predetermined high density detecting toner pattern formed on a photosensitive body and a density of a predetermined half-tone density detecting toner pattern formed on said photosensitive body; and
   image density correcting means for effecting a high density correction by comparing a value detected from said high density detecting toner pattern by said density detecting sensor with a high density reference value, and effecting a half-tone density correction by comparing a value detected from said half-tone density detecting toner pattern by said density detecting sensor with a half-tone density reference value,
   wherein said image density correcting means determines whether the half-tone density correction should be effected or not based on a result of the high density correction.

2. The image forming apparatus of claim 1, wherein said image density correcting means effects the half-tone density correction only when a difference between said high density reference value and the result of the high density correction satisfies a predetermined relation with a preset difference reference value.

3. The image forming apparatus of claim 2, wherein said image density correcting means adopts a result of a preceding high density correction as said high density reference value, compares said high density reference value with a result of a current high density correction, and effects the half-tone density correction only when a difference reaches or exceeds said preset difference reference value.

4. The image forming apparatus of claim 2, wherein said image density correcting means compares said high density reference value with a result of a current high density correction, and effects the half-tone density correction only when a difference reaches or exceeds said preset difference reference value.

5. The image forming apparatus of claim 2, wherein said image density correcting means adopts a result of the high density correction when a latest half-tone density correction was effected as said high density reference value, compares said high density reference value with a result of a current high density correction, and effects the half-tone density correction only when a difference reaches or exceeds said preset difference reference value.

6. The image forming apparatus of claim 1, wherein said image density correcting means forms said high density detecting toner pattern as a solid image, and said half-tone density detecting toner pattern as an image matrix in which a predetermined number of dots are formed by toner in a specific area and the number of dots is successively increased, so that more than one half-tone density detecting toner patterns each having a different density level is formed.

7. The image forming apparatus of claim 1, wherein said image density correcting means forms a plurality of high density detecting toner patterns on said photosensitive body by varying a developing bias voltage value, and adopts the result of the high density correction as the developing bias voltage value set during the high density correction.

8. The image forming apparatus of claim 1, wherein said image density correcting means forms a plurality of said half-tone density detecting toner patterns each having a different density on said photosensitive body by modulating a pulse width of a laser beam during exposure.

9. The image forming apparatus of claim 2, wherein, when a density of a color image is corrected, said image density correcting means compares said high density reference value with a result of a current high density correction, and effects the half-tone density correction for all colors when a difference in at least one color reaches or exceeds said preset difference reference value.

10. The image forming apparatus of claim 2, wherein said image density correcting means compares said high density reference value with a result of a current high density correction for each color, and effects the half-tone density correction only when a total of differences in all colors reaches or exceeds a preset total difference reference value.

11. The image forming apparatus of claim 2, wherein said image density correcting means compares said high density reference value with a result of a current high density correction for each color, and effects the half-tone density correction only when one of following events occurs:
    (1) when a difference in a monochromatic color reaches or exceeds a preset monochromatic difference reference value; and
    (2) when a total of differences in all colors excluding the monochromatic color reaches or exceeds a preset color total difference reference value.

12. The image forming apparatus of claim 2, wherein said image density correcting means compares said high density reference value with a result of a current high density correction for each color, and effects the half-tone density correction only when a total of absolute values of differences in all colors reaches or exceeds a preset absolute value total difference reference value.

13. An image forming apparatus comprising:
    a density detecting sensor for detecting a density of a predetermined high density detecting toner pattern formed on a photosensitive body and a density of a predetermined half-tone density detecting toner pattern formed on said photosensitive body; and
    image density correcting means for effecting a high density correction by comparing a value detected from said high density detecting toner pattern by said density detecting sensor with a high density reference value, and effecting a half-tone density correction by comparing a value detected from said half-tone density detecting toner pattern by said density detecting sensor with a half-tone density reference value,
    wherein said image density detecting means forms a plurality of half-tone density detecting toner patterns each having a different density level, compares a density of each of said half-tone density detecting toner patterns with said half-tone density reference value, effects the half-tone density correction with linear approximation values of a plurality of detected values after deleting any detected value which is equal to or smaller than a preset low density area deleting reference value in a low density area.

14. The image forming apparatus of claim 13, wherein said image density detecting means adopts, as said low density area deleting reference value, an inflection point of the detected values when a laser output is changed gradually from a lower end to a higher end.

15. The image forming apparatus of claim 14, wherein said image density detecting means adopts a point where the detected values start to rise continuously as said low density area deleting reference value for a color image.

16. The image forming apparatus of claim 14, wherein said image density detecting means adopts a point where the detected values start to drop continuously as said low density area deleting reference value for a monochromatic image.

17. An image forming apparatus which maintains an image density at a specific level by having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, wherein said image density correcting means adopts a result of a preceding high density correction as said high density reference value, compares said high density reference value with a result of a current high density correction, and effects the half-tone density correction only when a difference reaches or exceeds a preset difference reference value.

18. An image forming apparatus which maintains an image density at a specific level by having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, wherein said image density correcting means compares said high density reference value with a result of a current high density correction, and effects the half-tone density correction only when a difference reaches or exceeds a preset difference reference value.

19. The image forming apparatus of claim 18, wherein said image density correcting means adopts a result of the high density correction when a latest half-tone density correction was effected as said high density reference value, compares said high density reference value with the result of the current high density correction, and effects the half-tone density correction only when a difference reaches or exceeds said preset difference reference value.

20. The image forming apparatus of claim 18, wherein, in case of the high density correction of a color image, said image density correcting means compares said high density reference value with the result of the current high density correction, and effects the half-tone density correction for all colors when a difference in at least one color reaches or exceeds said preset difference reference value.

21. An image forming apparatus which maintains an image density at a specific level by having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, wherein said image density correcting means forms a plurality of half-tone density detecting toner patterns each having a different density level from a low density area to near a high density area and compares a detected value of each half-tone density detecting toner pattern with said half-tone density reference value and effects the half-tone density correction, while deleting any detected value which is equal to or smaller than a preset low density area deleting reference value in said low density area so as to effect the half-tone density correction in said low density area by means of liner approximation of a rest of the detected values.

22. The image forming apparatus of claim 21, wherein said image density correcting means adopts, as said low density area deleting reference value used for linear approximation in said low density area, an inflection point of detected values when a laser output is gradually changed from a lower end to a higher end.

23. An image forming apparatus which maintains an image density at a specific level by having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, wherein said image density correcting means compares said high density reference value with a result of a current high density correction for each color, and effects the half-tone density correction only when a total of differences in all colors reaches or exceeds a preset total difference reference value.

24. An image forming apparatus which maintains an image density at a specific level by having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, wherein said image density correcting means compares said high density reference value with a result of a current high density correction for each color, and effects the half-tone density correction only when one of following events occurs, (A) when a difference in a monochromatic color reaches or exceeds a preset monochromatic difference reference value, and (B) when a total of differences in all colors excluding the monochromatic color reaches or exceeds a preset color total difference reference value.

25. An image forming apparatus which maintains an image density at a specific level by having image density correcting means for effecting (1) a high density correction, by which a predetermined high density detecting toner pattern is formed on a photosensitive body, and a quantity of the high density correction is determined by comparing a value detected from said high density detecting toner pattern by a reflection sensor with a high density reference value; and (2) a half-tone density correction, by which a predetermined half-tone density detecting toner pattern is formed on the photosensitive body, and a quantity of the half-tone density correction is determined by comparing a value detected from said half-tone density detecting toner pattern by the reflection sensor with a half-tone density reference value, wherein said image density correcting means compares said high density reference value with a result of a current high density correction for each color, and effects the half-tone density correction only when a total of absolute values of differences in all colors reaches or exceeds a preset absolute value total difference reference value.

26. An image forming apparatus which maintains an image density at a specific level, comprising:

image density detecting means for carrying out a high density detection and a half-tone density detection of an image; and image density correcting means for effecting a high density correction based on a result of said high density detection, and determining whether a half-tone density correction should be effected in accordance with a result of said half-tone density detection from the result of said high density detection.

* * * * *